US012363021B2

(12) United States Patent
Maurice

(10) Patent No.: US 12,363,021 B2
(45) Date of Patent: Jul. 15, 2025

(54) UNIFIED RECOMMENDATION ENGINE

(71) Applicant: Ayla Networks, Inc., Milpitas, CA (US)

(72) Inventor: Sebastian Maurice, Toronto (CA)

(73) Assignee: Ayla Networks, Inc., Milpitas, CA (US)

( * ) Notice: Subject to any disclaimer, the term of this patent is extended or adjusted under 35 U.S.C. 154(b) by 0 days.

(21) Appl. No.: 18/205,945

(22) Filed: Jun. 5, 2023

(65) Prior Publication Data

US 2023/0353476 A1 Nov. 2, 2023

Related U.S. Application Data

(62) Division of application No. 17/545,534, filed on Dec. 8, 2021, now Pat. No. 11,711,287.

(51) Int. Cl.
*H04L 43/55* (2022.01)
*H04L 41/0659* (2022.01)
*H04L 41/0677* (2022.01)
*H04L 41/0823* (2022.01)
*H04L 41/083* (2022.01)
*H04W 24/06* (2009.01)

(52) U.S. Cl.
CPC .......... *H04L 43/55* (2022.05); *H04L 41/0661* (2023.05); *H04L 41/0677* (2013.01); *H04L 41/083* (2013.01); *H04L 41/0836* (2013.01); *H04W 24/06* (2013.01)

(58) Field of Classification Search
CPC . H04L 43/55; H04L 41/0672; H04L 41/0677; H04L 41/083; H04L 41/0836; H04W 24/06

USPC .................................................. 709/224, 231
See application file for complete search history.

(56) References Cited

U.S. PATENT DOCUMENTS

| | | | |
|---|---|---|---|
| 10,817,791 B1* | 10/2020 | Shoemaker | G06F 21/316 |
| 10,866,987 B2* | 12/2020 | Manning | G06F 16/904 |
| 10,873,533 B1* | 12/2020 | Ismailsheriff | H04L 47/27 |
| 11,316,941 B1* | 4/2022 | Jain | H04L 41/0816 |
| 11,373,640 B1* | 6/2022 | Chen | H04L 41/145 |
| 11,501,116 B1* | 11/2022 | Kakde | H01L 22/20 |
| 11,757,907 B1* | 9/2023 | Berger | G06N 7/01 726/23 |
| 11,860,727 B2* | 1/2024 | Munigala | G06F 16/2379 |
| 2020/0134628 A1* | 4/2020 | Jia | G06N 20/00 |

(Continued)

*Primary Examiner* — Karen C Tang
(74) *Attorney, Agent, or Firm* — Lowenstein Sandler LLP

(57) ABSTRACT

A method receives, from one or more subsystems, predicted outcomes associated with a device. The method provides provide at least a subset of the predicted outcomes as input to a machine learning model trained to identify a set of resolution actions. The method receives, from the machine learning model, the set of resolution actions for the subset of the predicted outcomes, wherein each resolution action in the set of resolution actions is associated with a probability of resolving at least one of the predicted outcomes in the subset of predicted outcomes. The method identifies a first resolution action from the set of resolution actions that has a highest probability of resolving the at least one of the predicted outcomes in the subset of predicted outcomes. The method identifies a root cause associated with the first resolution action. The method provides a first instruction to execute the first resolution action.

17 Claims, 10 Drawing Sheets

(56) References Cited

U.S. PATENT DOCUMENTS

| | | | | |
|---|---|---|---|---|
| 2020/0267057 A1* | 8/2020 | Garvey | ............... | H04L 41/0816 |
| 2020/0394098 A1* | 12/2020 | Frazier | ................ | G06F 11/0769 |
| 2021/0081819 A1* | 3/2021 | Polleri | ................... | G06N 5/022 |
| 2021/0126936 A1* | 4/2021 | Gerber, Jr. | .............. | H04L 63/20 |
| 2021/0142292 A1* | 5/2021 | Ozcaglar | ................ | G06F 18/24 |
| 2021/0157562 A1* | 5/2021 | Sethi | ....................... | G06F 9/453 |
| 2021/0158207 A1* | 5/2021 | Alsahlawi | ................ | G06N 5/04 |
| 2021/0211450 A1* | 7/2021 | Aleidan | .............. | H04L 63/1416 |
| 2021/0232934 A1* | 7/2021 | Lai | ......................... | G06N 20/00 |
| 2021/0241137 A1* | 8/2021 | Jain | ....................... | G16H 10/20 |
| 2021/0248514 A1* | 8/2021 | Cella | ..................... | G06V 20/20 |
| 2021/0306201 A1* | 9/2021 | Wang | ................. | G06F 11/0793 |
| 2021/0326742 A1* | 10/2021 | Rosset | ................... | G06N 20/00 |
| 2021/0385135 A1* | 12/2021 | Côté | ..................... | G06F 17/18 |
| 2022/0014534 A1* | 1/2022 | Basovskiy | .......... | H04L 63/1433 |
| 2022/0044168 A1* | 2/2022 | Oberman | ........... | G06Q 10/0633 |
| 2022/0222097 A1* | 7/2022 | Lokesharadhya | ... | G06F 11/1484 |
| 2022/0233119 A1* | 7/2022 | Shelton, IV | ..... | A61B 17/07207 |
| 2022/0253725 A1* | 8/2022 | Feng | ....................... | G06N 20/00 |
| 2022/0261668 A1* | 8/2022 | Stumpe | ................. | G06F 16/284 |
| 2022/0309507 A1* | 9/2022 | Ross | ....................... | G06Q 20/02 |
| 2022/0375056 A1* | 11/2022 | Weiss | ....................... | G06T 7/11 |
| 2023/0054912 A1* | 2/2023 | Dixit J | .................... | G06V 30/16 |
| 2023/0153191 A1* | 5/2023 | Gennetten | ........... | G06F 11/0772 |
| | | | | 714/57 |
| 2023/0153566 A1* | 5/2023 | Quader | .................. | G06N 3/084 |
| | | | | 706/20 |

* cited by examiner

UNIFIED RECOMMENDATION ENGINE

RELATED APPLICATIONS

The present application is a divisional of U.S. patent application Ser. No. 17/545,534, filed Dec. 8, 2021, the entire contents of which are hereby incorporated by reference herein.

TECHNICAL FIELD

Embodiments of the disclosure relate generally to machine learning, and more specifically, relate to a unified recommendation engine (URE) that combines the outputs of multiple machine learning models as inputs into a single URE machine learning model.

BACKGROUND

The amount of data being generated in many modern systems is continuously expanding. For example, data reports associated with user devices (e.g., mobile phones) are being generated on a regular basis, such as daily or multiple times a day. Systems that receive these streams of data can adopt various approaches to process the data and implement processes in response to the received data.

BRIEF DESCRIPTION OF THE DRAWINGS

Reference will now be made to the accompanying drawings showing example embodiments of the present application.

DETAILED DESCRIPTION OF EMBODIMENTS

Figure 1:
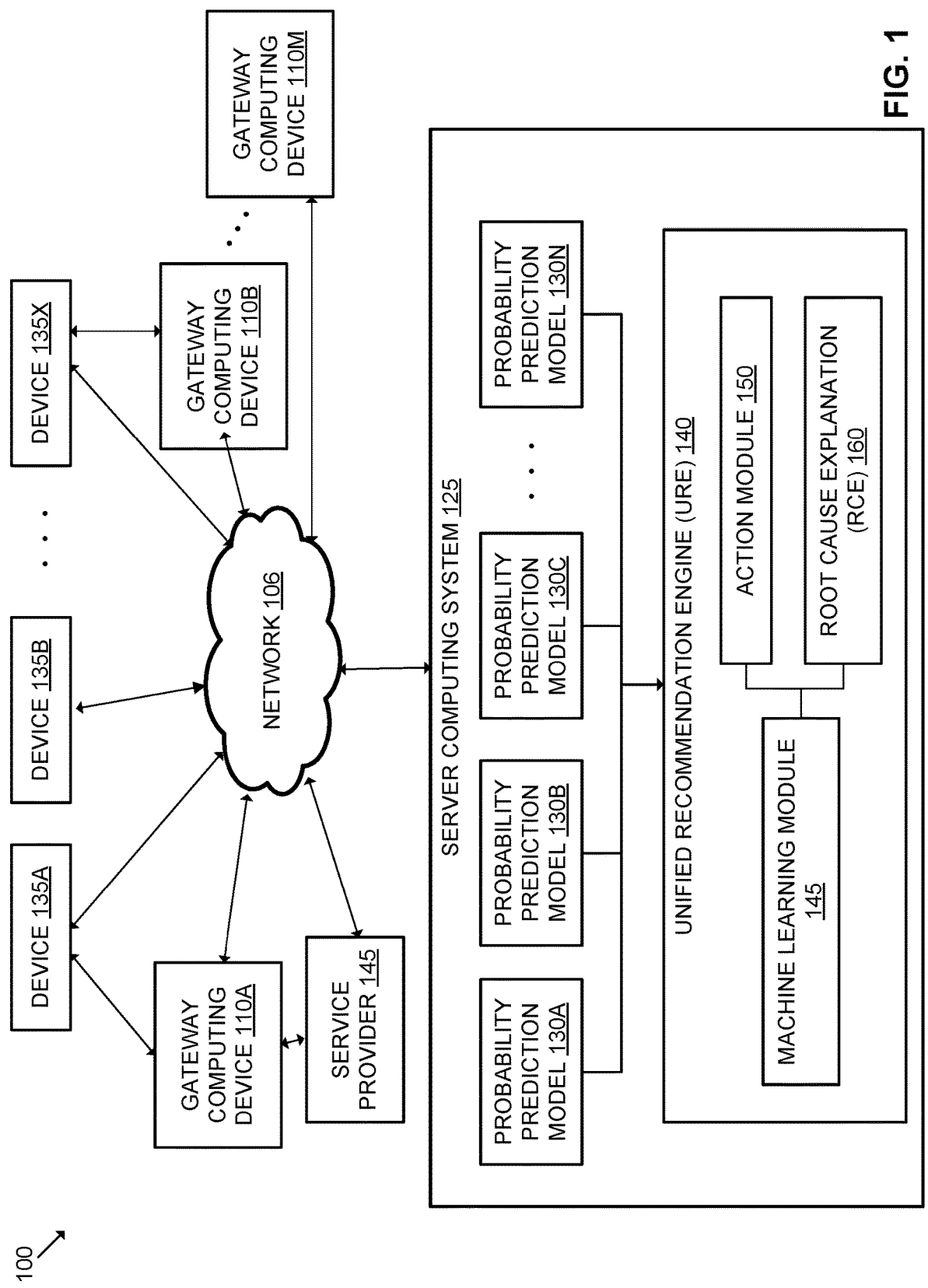
FIG. 1 is a block diagram depicting an example network architecture, in accordance with some embodiments of the present disclosure.

Embodiments described herein are directed to a unified recommendation engine (URE) that can combine the output received from multiple sub-systems (e.g., multiple machine learning models each trained to output different predictions) and process the combined output using a trained machine learning model in order to predict and automatically pre-emptively resolve predicted device problems. The URE described herein can be applied in a variety of industries, including in telecommunications, Internet of Things (IoT), or any other system that includes multiple connected devices and/or that includes one or more devices that are subject to errors or problems. Such devices can include mobile devices, devices with embedded systems (e.g., IoT enabled devices, Internet accessible devices, gateway devices, routers, modems, cell phone towers, etc.), and/or other computing devices. The devices can include gateway devices that manage accessibility to the internet for connected devices. The connected devices can communicate with cloud computing environments or other Internet accessible server systems via gateway devices. The gateway devices can communicate with an internet service provider (ISP) using a particular communication configuration protocol that specifies the sequence, format, and/or content of network communication messages as well as the configuration parameters, settings, etc., of the devices.

Using telecommunication systems as an example for some embodiments, such systems may include discrete conventional machine learning models that can predict disparate problems with individual devices within the system. For example, a slow browse machine learning model can predict the probability that one of the connected devices (e.g., a mobile device) will experience slow browse in an upcoming time frame. Slow browse is a problem in which the device's browsing feature (e.g., for an internet browser application executing on the device) is operating with increased, or gradually increasing, latency over a predetermined period of time. For example, a user can experience a delay associated with the browsing feature provided by the user's mobile device. A slow browse machine learning model can be trained to predict when a particular device may experience a slow browse condition. Another machine learning model example can predict Wi-Fi® performance degradation. For example, throughout a given time period, a device may experience worsening Wi-Fi performance. The Wi-Fi performance machine learning model can be trained to predict when a particular device may experience Wi-Fi performance degradation. Another machine learning model example can predict a power-on reset (PoR) failure for a particular device within a predetermined time period. A PoR prediction signifies that there may be an issue with the device, which can be resolved by resetting the device (e.g., by turning it off and back on again).

In embodiments, systems can use the predictions from such individual machine learning models to implement distinct solutions to address each individual predicted outcome received from the models. Example solutions can include staffing help desk calls, or manually deploying solutions to connected devices to attempt to resolve the predicted problem. Addressing the predicted problems on an individual basis as they arise, however, can lead to ad hoc and delayed customer care. For example, a service provider may receive a prediction of potential Wi-Fi performance issues for a set of devices within the system, and may respond by implementing a channel rescan action. However, this solution may not resolve the predicted problem, or may not resolve a predicted outcome received from one of the other machine learning models (e.g., a separate machine learning model may predict when to perform a PoR for a particular device, and the channel rescan resolution action may not resolve a problem that would be solved by a PoR). Such ad hoc and delayed customer care actions can lead to high number of calls to the customer care hotline, and/or an increased number of house calls made by technicians to attempt to resolve failures.

Aspects of the present disclosure according to embodiments described herein remedy the above-noted and other deficiencies by implementing a recommendation engine (URE) that unifies discrete predictions from various machine learning models into a comprehensive model that can predict outcomes and execute the associated resolution actions to the predicted outcomes. In embodiments, the predicted outcomes can be issues affecting devices within a network of devices. Examples of the issues affecting devices can be Wi-Fi degradation, slow browse, and/or power on reset. Other issues affecting devices can also be included in the URE. The URE can receive predictions from individual machine learning models, such as a Wi-Fi performance prediction model, a slow browse prediction model, a power on reset prediction model, and/or other prediction models, and can use the received predictions as input to an overarching machine learning model. The URE can include a machine learning model that is trained to simultaneously make recommendations of actions to resolve predicted problems (and automatically implement the recommended actions to resolve the predicted problems), as well as identify the root-causes of the predicted problems for devices within the system.

The URE can be trained using a multi-class estimator, such as a decision tree algorithm, a random forest, or a neural network, for example. In embodiments, the URE can be trained using a logistic regression algorithm. The training dataset can include predicted outcomes from various discrete machine learning models, and a database that associates resolution actions with the predicted outcomes. Once the URE model is trained, the predicted outcomes received from the various machine learning sub-machine learning models are provided as input to the trained URE model. The trained URE model outputs a set of actions to resolve one or more of the predicted outcomes at a certain time (e.g., time T). The set of actions can include brute force actions, such as a device reboot, a radio reset or a channel rescan, and/or the set of actions can include more subtle actions that may be undetectable to a user of the device.

Each action in the set of actions can be associated with a probability that the action will resolve the predicted outcome(s), and the set of actions can be ranked according their probabilities. One of the actions from the set of actions (e.g., the action with the highest probability) can be performed at a time T+1 (e.g., time T plus 1 minute, or time T plus 1 hour). At time T+2, the system can determine whether the predicted outcomes that the performed resolution action was meant to resolve was actually resolved. For example, the system can receive updated predicted outcomes from the various machine learning sub-models, and can determine whether the predicted outcomes that the performed action was meant to resolve are included in the updated predicted outcomes. If they are included, the system can determine that the performed action did not resolve the predicted outcomes as intended. The system can then perform a second action from the set of actions output by the trained URE model (e.g., the second action can be the action with the second highest probability). If, on the other hand, the performed action did resolve the predicted outcomes as intended, the system can update the training dataset to indicate that the performed action resolved the predicted outcome(s).

In embodiments, the URE can recommend a particular action or set of actions, and a user can have control over whether to perform an action and/or which action to perform. The URE can detect execution of an action and can update the training dataset accordingly. In embodiments, if none of the recommended resolution actions resolved one or more of the predicted outcomes for a particular device after a certain time period (e.g., after 5 hours, or after 3 days), the URE can update an exceptions data structure with the device serial number. For example, the URE can update an exceptions table that stores the serial numbers of devices that may be experiencing issues or failures that the predicted resolution actions did not resolve. In embodiments, once the URE has added the device to the exception data structure, the URE can remove the device from the list of devices that are analyzed by the URE. Once the failures or issues associated with the device have been resolved, the exceptions data structure can be updated, and the device can then be analyzed by the URE. In embodiments, a user can update the exceptions data structure and re-submit the device to the URE for analysis. In some embodiments, a user can delete the device from the exceptions data structure, in which case the device is considered to be decommissioned, in which case the device is taken out of circulation and no longer used.

In some embodiments, the URE can function on autopilot mode, in which the URE automatically performs one or more of the output recommended actions. The actions can be scheduled to be executed at a future date/time, for example, to accommodate a system's maintenance window. In embodiments, when the URE functions in autopilot mode, the URE can automatically remove the device from the exceptions data structure after a predetermined time period. For example, if a device has been in the exceptions data structure for a predetermined number of hours or days (e.g., for 3 days), the URE can automatically remove the device from the exceptions data structure and resubmit the device to URE analysis.

The URE can also provide a root-cause explanation (RCE) along with the output set of actions. The RCE can include gathering information about the various features with anomalies associated the predictions of the subsystem machine learning models, and providing an explanation of the root-cause of the predicted outcomes. The root-cause analysis can include using a correlation matrix and/or a multiple linear regression algorithm to determine features that are positively correlated with the predicted outcomes and features that are negatively correlated with the predicted outcomes. Based on these identified features, the URE can identify the root-cause associated with the predicted outcomes.

Advantages of aspects of the present disclosure include, but are not limited to, reduced disruptions to the connected devices within the system. By unifying individual and separate machine learning models, the unified recommendation engine (URE) can take proactive actions to resolve predicted failures before they occur, thus reducing the number of device failures. This, in turn, can increase the overall system performance, since actions can be implemented before the failures occur, which can reduce exposure to feature anomalies and potential error conditions. Such advantages can lead to increased customer experience and reduced customer churn within the system. Furthermore, the URE determines a root-cause explanation of the predicted outcomes and the actions that proactively resolved the failures at the same time as determining the resolution actions, thus providing a deeper understanding of the potential failures to the user.

FIG. 1 is a block diagram depicting an example network architecture 100, in accordance with embodiments of the present disclosure. The network architecture 100 includes one or more devices 135A-X connected to a server computing system 125 via a network 106. Examples of devices 135A-X can include mobile client devices (e.g., mobile phones), IoT devices, and/or other client computing devices.

The devices 135A-X can connect directly to network 106, or can connect via one or more gateway computing device 110A-M. Gateway computing devices 110A-M can provide a connectivity point between two networks, or between devices (e.g., devices 135A-X and/or other gateway devices 110A-M) within the same network. Gateway computing devices 110A-N can be, for example, a router, a server, a firewall, or some other device that enables data to flow in and out of a network (e.g., network 106). In embodiments, gateway devices 110A-M can act as a translator, and may translate (or convert) received data into a particular format or communication protocol recognized by the devices 135A-X and/or other gateway devices 110A-M within the network.

Network 106 can include a local area network (LAN), which can include a router, switch, bridge or other network device (not shown) that enables communication between multiple devices (e.g., gateway computing devices 110A-M) connected to the LAN. The network device may provide wired connections to the LAN using, for example, Ethernet ports, universal serial bus (USB) ports and/or Firewire® ports. The network device may additionally provide wireless connections to the LAN using, for example, a Wi-Fi transceiver. In embodiments, network 106 can include a wide area network (WAN), which may be a private WAN (e.g., an intranet) or a public WAN such as the Internet, or may include a combination of a private and public network.

The network 106 may include or connect to a server provider 145. Service provider 145 can include any Internet Service Provider (ISP) that provides the gateway computing devices 110A-M with access to a WAN (e.g., Verizon®, Xfinity®, AT&T®, Sprint®, etc.). Service provider 145 can include one or more server computing devices to facilitate access to network 106. Service provider 145 can include configuration service (not pictured) that is responsible for configuring and/or managing communication with gateway computing devices 110A-M and/or devices 135A-X. In various implementations, the configuration service can establish a communication connection with a gateway computing device 110A-M to facilitate connectivity with network 106 as well as perform configuration operations on gateway computing device 110A-M to maintain stable communications with service provider 145.

In various implementations, the communication connection between the gateway devices 110A-M and the service provider 145 can utilize (or be associated with) a communication protocol for management of the gateway devices 110A-M (or other CPE) communicating with the service provider 145, as well as any additional devices associated with the gateway(s) (or other CPE) (e.g., devices 135A-X). The communication protocol can specify the type of data that can be passed between the service provider 145 and the gateway devices 110A-M using the communication connection. In other words, the protocol can specify one or more communication "features" for the communication connection between service provider 145 and the gateway devices 110A-M. In some instances, the communication features can include device attributes, device settings, configuration settings, communication connection information, or other types of data elements associated with the gateway devices 110A-M (or 135A-X). Additionally or alternatively, the communication features can include information associated with the communication connection itself.

The network 106 may additionally include or connect to server computing device 125. The server computing device 125 may include a physical machine and/or a virtual machine hosted by a physical machine. The physical machine may be a rackmount server, a desktop computer, or other computing device. In one embodiment, the server computing device 125 can include a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

The server computing device 125 can host one or more probability prediction models 130A-N, as well as a unified recommendation engine (URE) 140. The URE 140 can include a machine learning module 145, an action module 150, and/or a root cause explanation (RCE) module 160. The probability prediction models 130A-N can be trained to predict outcomes (e.g., issues or failures) associated with the connected devices in the system (e.g., devices 135Z-X, 110A-M). Each probability prediction model 130A-N can run mutually exclusively of the other models 130A-N. The server computing system 125 can receive data from devices 135A-X, and gateway computing devices 110A-M, and can provide the received data as input to the models 130A-N. Each model 130A-N can predict the probability that a particular outcome associated with the model will occur for a particular device 135A-X, 110A-M. For example, model 130A can predict the probability that a PoR is applicable for devices 135A-X, 110A-M, model 130B can predict the probability that a slow browse failure will occur for devices 135A-X, 110A-M, and model 130C can predict the probability that a Wi-Fi performance degradation failure will occur for devices 135A-X, 110A-M. The models 130A-N can include additional or fewer models than those described herein.

The URE 140 can receive the predicted outcomes (e.g., issues or failures) from the models 130A-N and can provide the received predicted outcomes as input to the machine learning model module 145. The machine learning model 145 can be trained to identify predicted outcomes for the devices within the system (e.g., devices 135A-X, 110A-M) and to provide recommended actions to resolve the predicted outcomes. In embodiments, the machine learning model 145 can identify recommended actions for predicted outcomes that exceed a certain threshold value (e.g., predicted outcomes greater than 75%, or greater than 80%). For example, some systems can receive around 10 million predictions per hour for the devices within the system, and hence the URE 140 may decide to recommend actions for predicted outcomes that exceed a certain likelihood of occurring. The output of the machine learning module 145 can be a probability distribution of the recommended resolution actions, ranked form highest probability action to lowest probability action.

The action module 150 can receive the ranked recommended resolution actions and determine to execute the resolution action(s). In embodiments, the action module 150 can execute one or more of the resolution actions, or can schedule one or more of the resolution actions to be performed according to the system's maintenance window. Some systems can have a predetermined maintenance time period window during which resolution actions may be performed. For example, resolution actions that include a device reboot may be limited to execution between 2 am and 5 am to avoid customer disruption. In some embodiments, the action module 150 can provide an instruction to a user to execute one or more the resolution actions, and can determine when the resolution action(s) have been performed.

The action module 150 can determine to first execute the recommended resolution action with the highest probability. The action module 150 can determine whether the execution of the first resolution action resolved the associated predicted outcome(s). If the execution of the first resolution action did not resolve the associated predicted outcome(s), the action module 150 can execute the second recommended resolution action with the second highest probability. The action module 150 can notify the machine nearing module 145 of the recommended action that resolved associated predicted outcome(s). The execution of actions is further described with respect to FIGS. 2 and 3.

The RCE 160 can determine the root cause of the predicted outcomes. The RCE 160 can classify the features that are causing issues for each device. The classifications can then be aggregated across a group of devices (e.g., all the devices within a system, or a subset of devices within the system) to provide an overview of the issues affecting the group of devices. For example, by aggregating the issues experienced by a group of devices, the RCE 160 can determine that 10% of the devices experienced hardware-related issues, 25% of the devices experienced software-related issues, 40% of the devices experienced network issues, and 25% of the devices experienced Internet issues. The RCE 160 can determine the root cause(s) of the predicted outcomes for a predetermined preceding timeframe (e.g., 10% of the devices experienced hardware-related issues in the past 5 hours). The RCE 160 can use a correlation matrix and/or a multiple linear regression function to determine the features correlated with the features of the predicted outcomes. In embodiments, the RCE 160 can determine the root cause of the predicted outcome(s) while the action module 150 is executing the recommended actions. The RCE 160 is further described with respect to FIGS. 4, 5, 6A-6B.

Figure 2:
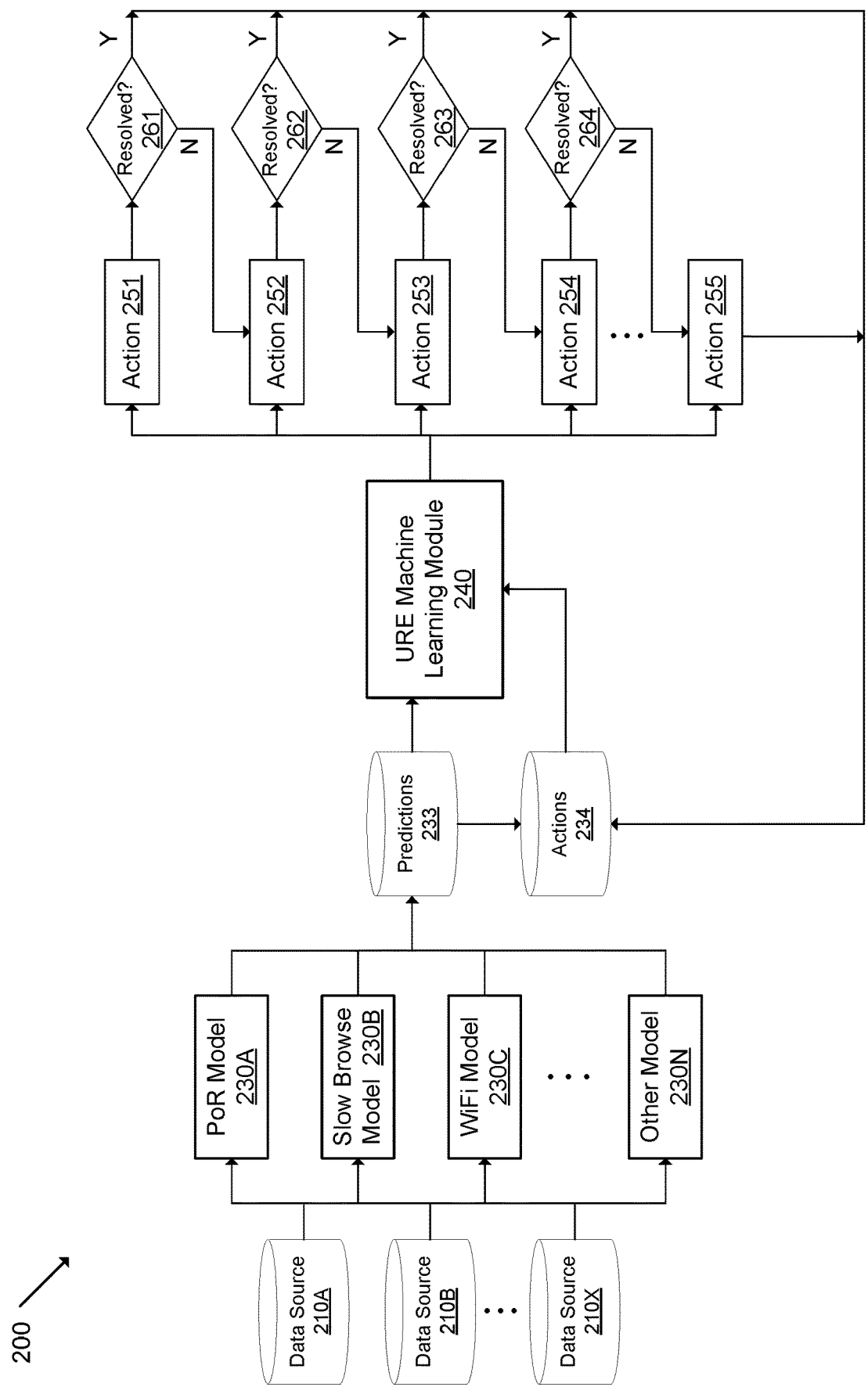
FIG. 2 illustrates a workflow for implementing a unified recommendation engine, in accordance with some embodiments of the present disclosure.

FIG. 2 illustrates a workflow 200 for implementing a unified recommendation engine, in accordance with embodiments of the present disclosure. In embodiments, workflow 200 can be implemented by a server computing device 125 of FIG. 1.

Data sources 210A-X can include, for example, device data reports from the devices in a system. Data sources 210A-X can also include device information for the devices within the system. The devices can be devices 135A-X, and/or gateway computing devices 110A-M of FIG. 1, for example. The data sources 210A-X are provided as inputs to one or more machine learning models 230A-N. The one or more machine learning models 230A-N, and/or the URE machine learning model 240, may be neural networks, deep learning models, decision trees, random forest models, support vector machines, regression models and/or other types of machine learning models.

One type of machine learning model that may be used is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In an image recognition application, for example, the raw input may be a matrix of pixels; the first representational layer may abstract the pixels and encode edges; the second layer may compose and encode arrangements of edges; the third layer may encode higher level shapes (e.g., teeth, lips, gums, etc.); and the fourth layer may recognize a scanning role. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

Training of a neural network and other types of machine learning models may be achieved in a supervised learning manner, which involves feeding a training dataset consisting of labeled inputs through the network or other model, observing its outputs, defining an error (by measuring the difference between the outputs and the label values), and using techniques such as deep gradient descent and back-propagation to tune the weights of the network or other model across all its layers and nodes such that the error is minimized. In many applications, repeating this process across the many labeled inputs in the training dataset yields a network that can produce correct output when presented with inputs that are different than the ones present in the training dataset. In high-dimensional settings, such as large images, this generalization is achieved when a sufficiently large and diverse training dataset is made available.

A training dataset containing hundreds, thousands, tens of thousands, hundreds of thousands or more data points should be used to form a training dataset. In embodiments, up to millions of reports of device status, network status, etc. are included in a training dataset. Each data point may include, for example, data relating to event logs, system, network and/or application errors (e.g., bug reports), anonymized user activity data, past system, network and/or device failures, and other data reported by the devices, gateway device, and/or network. The data can also include anonymized customer information data from the system (e.g., from the network provider). The variables in the data can include, but are not limited to, the timeliness of the data (e.g., the delay between the occurrence of the event reported and the time at which the event is reported), the consistency of the data, the completeness of the data, and the reliability of the data. This data may be processed to generate one or multiple training datasets for training of one or more machine learning models 230A-N. The machine learning models 230A-N may be trained, for example, to output predictions of future problems on one or more types of devices.

In one embodiment, generating one or more training datasets includes gathering data points with labels. The labels that are used may depend on what a particular machine learning model will be trained to do. For example, to train a machine learning model to predict slow browse, the labels attached to data may include an indication as to whether or not slow browse had occurred and/or a browse speed and/or browse latency. In embodiments, labels may also include indications of actions that were performed to remedy problems and/or whether the problems were actually resolved as a result of the actions.

To effectuate training, processing logic inputs the training dataset(s) into one or more untrained machine learning models. Prior to inputting a first input into a machine learning model, the machine learning model may be initialized. Processing logic trains the untrained machine learning model(s) based on the training dataset(s) to generate one or more trained machine learning models that perform various operations as set forth above.

Training may be performed by inputting one or more of the data points into the machine learning model one at a time. Each input may include data from or associated with a device at a point in time. The data that is input into the machine learning model may include a single layer or multiple layers. In some embodiments, a recurrent neural network (RNN) is used. In such an embodiment, a second layer may include a previous output of the machine learning model (which resulted from processing a previous input).

The machine learning model processes the input to generate an output. An artificial neural network includes an input layer that consists of values in a data point (e.g., intensity values and/or height values of pixels in a height map). The next layer is called a hidden layer, and nodes at the hidden layer each receive one or more of the input values. Each node contains parameters (e.g., weights) to apply to the input values. Each node therefore essentially inputs the input values into a multivariate function (e.g., a non-linear mathematical transformation) to produce an output value. A next layer may be another hidden layer or an output layer. In either case, the nodes at the next layer receive the output values from the nodes at the previous layer, and each node applies weights to those values and then generates its own output value. This may be performed at each layer. A final layer is the output layer, where there is one node for each class, prediction and/or output that the machine learning model can produce. For example, for an artificial neural network being trained to predict slow browse, there may be a first class (slow browse), a second class (absence of slow browse). Alternatively, or additionally, for an artificial neural network trained to predict slow browse, the machine learning model may output a predicted browse speed. Accordingly, the output may include one or more prediction and/or one or more a probability of an event occurring within a future time period.

Processing logic may then compare the generated prediction and/or other output to the known condition and/or label that was included in the training data item. Processing logic determines an error (i.e., a classification error) based on the differences between the output probability map and/or label(s) and the provided probability map and/or label(s). Processing logic adjusts weights of one or more nodes in the machine learning model based on the error. An error term or delta may be determined for each node in the artificial neural network. Based on this error, the artificial neural network adjusts one or more of its parameters for one or more of its nodes (the weights for one or more inputs of a node). Parameters may be updated in a back propagation manner, such that nodes at a highest layer are updated first, followed by nodes at a next layer, and so on. An artificial neural network contains multiple layers of "neurons," where each layer receives as input values from neurons at a previous layer. The parameters for each neuron include weights associated with the values that are received from each of the neurons at a previous layer. Accordingly, adjusting the parameters may include adjusting the weights assigned to each of the inputs for one or more neurons at one or more layers in the artificial neural network.

Once the model parameters have been optimized, model validation may be performed to determine whether the model has improved and to determine a current accuracy of the model. After one or more rounds of training, processing logic may determine whether a stopping criterion has been met. A stopping criterion may be a target level of accuracy, a target number of processed data items from the training dataset, a target amount of change to parameters over one or more previous data points, a combination thereof and/or other criteria. In one embodiment, the stopping criteria is met when at least a minimum number of data points have been processed and at least a threshold accuracy is achieved. The threshold accuracy may be, for example, 70%, 80% or 90% accuracy. In one embodiment, the stopping criteria is met if accuracy of the machine learning model has stopped improving. If the stopping criterion has not been met, further training is performed. If the stopping criterion has been met, training may be complete. Once the machine learning model is trained, a reserved portion of the training dataset may be used to test the model.

In embodiments, PoR model 230A can be a power on reset (PoR) model trained to predict the probability that a device will experience an issue or failure associated with a power on reset (i.e., an issue or failure that may be corrected or resolved by resetting the device). For example, output from PoR model 230A can be a probability indicating whether the device should be reset. Slow browse model 230B can be a slow browse model trained to predict the probability that a device will experience a slow browse failure. Wi-Fi model 230C can be a Wi-Fi model trained to predict the probability that a device will experience Wi-Fi performance degradation.

In some embodiments, the PoR model 230A can predict the probability that a device will experience a PoR failure in a predetermined time period (e.g., in the next 3 hours), as well as output one or more resolution actions to resolve the predicted outcomes. Similarly, in some embodiments, the slow browse model 230B and the Wi-Fi model 230C can each output a set of resolution actions to resolve the predicted outcomes. The resolution actions can each have an associated probability of resolving one or more predicted outcomes. For example, the slow browse model 230B can predict that a particular device has an 90% chance of experience a slow browse event in a predetermined period of time, and in some embodiments, the slow browse model 230B can also one or more resolution actions, where each resolution action has an associated probability of resolving the slow browse event (e.g., a reboot action can be associated with a 95% chance of resolving the predicted slow browse event, while a channel scan action can be associated with a 55% chance of resolving the predicted slow browse event).

Predictions 233 can be added to a data store used to store the outputs of machine learning models 230A-N. Predictions 233 can be received from the machine learning models 230A-N; that is, predictions 233 can include the outputs of machine learning models 230A-N. Actions 234 can be added to a data store that includes resolution actions associated with the predictions 233. In embodiments, the machine learning models 230A-N can also predict the actions 234 associated with the predictions 233. In some embodiments, the actions 234 are provided by a service provider. For example, in a telecommunications example, the telecommunications service provider can provide a list of actions 234 to take to resolve potential problems with the devices within the system.

The predictions 233 and the actions 234 can be provided as input to URE machine learning model 240. The URE machine learning model 240 can be trained to predict potential outcomes and recommend associated resolution actions for devices within the system. The output of the URE machine learning model 240 can be the set of resolution actions 251-255. The URE machine learning model 240 can output fewer or more actions than those illustrated in FIG. 2.

The outcomes predicted by URE machine learning model 240 can each be associated with probability that the predicted outcome will occur. For example, the URE machine learning model 240 can predict that a particular device within the system has a 40% chance of experiencing a PoR failure, a 60% chance of experiencing a slow browse event, and 85% chance of experience Wi-Fi degradation within a predetermined period of time.

The actions predicted by the URE machine learning model 240 can each be associated with a probability that the action will resolve at least one of the predicted outcomes. For example, as illustrated in FIG. 2, the URE machine learning model 240 can output actions 251-255. Each action 251-255 can be associated with a probability that the action 251-255 will resolve the outcomes predicted by the URE machine learning model 240. To continue the example above, action 251 can be associated with a 90% chance of resolving the Wi-Fi degradation, a 89% chance of resolving the slow browse event, and 50% of resolving the PoR; action 252 can be associated with a 89% chance of resolving the Wi-Fi degradation and a 57% chance of resolving the slow browse event (action 252 may not be associated with resolving a PoR, for example); action 253 may have a 55% chance of resolving all three predicted outcomes; and so on. In embodiments, the URE machine learning model 240 can combine the probabilities of resolving the predicted outcomes and can provide a single probability associated with each action 251-255. The actions 251-255 can be ranked, e.g., from highest probability to lowest probability. For example, action 251 can have the highest associated probability of resolving the outcomes predicted by the URE machine learning model 240, and action 255 can have the lowest associated probability of resolving the outcomes predicted by the URE machine learning model 240.

The URE machine learning model 240 can be described as a system of systems (SoS). In embodiments, the sub-systems within the URE SoS are the machine learning models 230A-N. In some embodiments, the mathematical model formulation for the SoS can be as follows:

Let SS be the set of all sub-systems i. A sub-system can be machine learning models 230A-N and/or some other source of information.

$$SS = \{ss_i^d | i \geq 2, \text{ for every } DSN \; d > 0\}$$

Let F be a set of features in each sub-system $ss_i^d$:

$$F = \{f_j^{i,d} | f_j^{i,d} \in SS, \; i \geq 2, j > 0, \text{ for every } DSN \; d > 0\}$$

Let F' be a set of unique features from all sub-systems $ss_i^d$:

$$F' = \left\{ \begin{array}{l} f_j^{i,d} | f_j^{i,d} \in SS, i \geq 2, j > 0, \text{ for every } DSN \; d > 0 \\ \text{and } f_j^{i,d} \text{ occurs only once across all } i \text{ models} \end{array} \right\}$$

Let S be the overall system that is a combination of sub-systems:

$$S_t^d = \sum_{i=1}^{n} ss_{i,t}^d, \; n \geq 2, t > 0, d > 0$$

$$S_t^d = ss_{1,t}^d + ss_{2,t}^d + ss_{3,t}^d + \ldots ss_{n,t}^d$$

For example, $ss_{1,t}^d$ can be PoR machine learning model 230A, $ss_{2,t}^d$ can be Slow Browse machine learning model 230B, $ss_{3,t}^d$ can be WiFi machine learning model 230C, etc.

Now assume every $ss_{i,t}^d$ outputs some value $v_{i,t}^d$ over time t. Let the values of $v_{i,t}^d$ be classified as low, medium, or high where these classes are dependent upon the context of $ss_{i,t}^d$. For example, if $v_{i,t}^d$ are probabilities, then: $v_{i,t}^d$ is low if $v_{i,t}^d > 0$ and $v_{i,t}^d \leq 0.5$; $v_{i,t}^d$ is medium if $v_{i,t}^d > 0.5$ and $v_{i,t}^d < 0.75$; and $v_{i,t}^d$ is high if $v_{i,t}^d > 0.75$ and $v_{i,t}^d \leq 1$.

Furthermore, let SA be the set of actions j from action 234, or recommendations for system S for DSN d over time t:

$$SA_t^d = \{\text{actions } j \text{ are finite for the system } S\}$$

Every action in actions 234 is associated with a combination of sub-systems $ss_{i,t}^d$. For example, let $ss_{1,t}^d$=PoR and outputs $v_{1,t}$ where $v_{1,t} > 0$ and $v_{1,t} \leq 1$ $ss_{2,t}^d$=Slow Browse and outputs $v_{2,t}$ where $v_{2,t} > 0$ and $v_{2,t} \leq 1$ $ss_{3,t}^d$=WiFi Performance and outputs $v_{3,t}$ where $v_{3,t} > 0$ and $v_{3,t} \leq 1$ For every $j^{th}$ combination of $v_{1,t}$, $v_{2,t}$, and $v_{3,t}$ choose $act_{j,t}^d$ for $S_t^d$. $S_t^d$ can be considered as the dependent variable that is classified by some set of actions. $S_t^d$ therefore is a multi-class dependent variable.

For every $j^{th}$ combination of $v_{1,t}$, $v_{2,t}$, and $v_{3,t}$ choose $act_{j,t}^d$ for $S_t^d$. For example, combination 1: $\{v_{1,t}, v_{2,t}, \text{ and } v_{3,t}\}=\{\text{high, high, high}\}=act_{1,t}^d$; combination 2: $\{v_{1,t}, v_{2,t}, \text{ and } v_{3,t}\}=\{\text{low, low, low}\}=act_{2,t}^d=\text{no action}$; combination 3: $\{v_{1,t}, v_{2,t}, \text{ and } v_{3,t}\}=\{\text{high, low, med}\}=act_{3,t}^d$; combination 4: $\{v_{1,t}, v_{2,t}, \text{ and } v_{3,t}\}=\{\text{high, high, med}\}=act_{1,t}^d+act_{3,t}^d$; etc.

It should be noted that actions can be combined if the one action is associated with the $j^{th}$ combination. Actions should be specified for outputs that have a high value. If no high value is output, then no action should be taken. For example, combination 2 above does not have a high value in the set of outputs, and hence no action is to be taken. In embodiments, the actions and combinations can be predetermined by domain experts. URE machine learning model 240 can output a set of actions 251-255. The actions may be ranked accordingly to one or more criteria, such as a probability that the action will resolve some or all predicted problems from predictions 233. One or more of the actions 251-255 may be performed in order, starting with a highest ranked action (e.g., action 251).

Referring to workflow 200 of FIG. 2, action 251 may be a highest ranked action, and can be performed at a specific time T. At time T+1, at block 261, the workflow determines whether the action 251 resolved the predicted outcomes or problems/issues that were identified by one or more models 230A-N, and which may have been associated with action 251 by the one or more models 230A-N. If the execution of action 251 resolved the predicted outcomes associated with the action 251, the workflow updates the actions 234 to indicate that the action 251 resolved the predicted outcomes. If the execution of action 251 did not resolve the predicted outcomes associated with the action 251, a next highest ranked action 252 is performed, for example at time T+2. At time T+3, at block 262, the workflow determines whether action 252 resolved the predicted outcomes associated with the action 252. If the execution of action 252 resolved the predicted outcomes associated with the action 252, the workflow updates the actions 234 to indicate that the action 252 resolved the predicted outcomes. If not, the workflow performs action 253. The workflow continues to action 254 and 255 until the predicted outcomes have been resolved or all actions have been performed.

The training dataset used to train the URE machine learning model 240 can be updated according to which action(s) resolved the predicted outcomes. For example, actions 234 can be updated with the action 251-255 that resolved one or more of the predictions 233. By restraining the URE 240 using updated data, the URE 240 continuously improves. Over time, by continually providing updated data and retraining the URE 240, the predicted outcomes and associated resolution actions output by the URE 240 become more and more accurate. For example, over time, the URE 240 can continue to improve by associating the appropriate action from actions 234 with one or more predictions 233.

Figure 3:
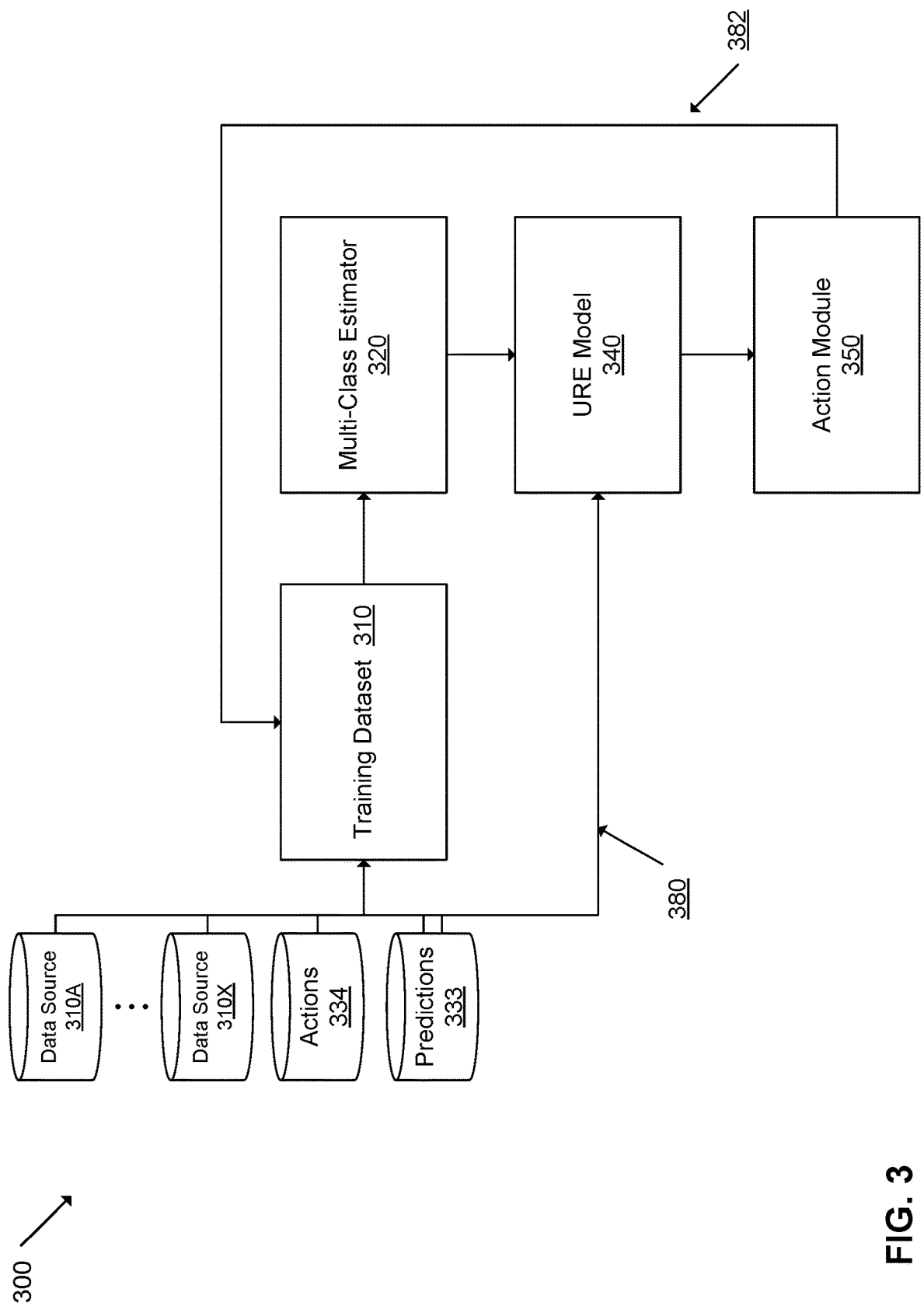
FIG. 3 illustrates a workflow for training a unified recommendation engine machine learning model, in accordance with some embodiments of the present disclosure.

FIG. 3 illustrates a workflow 300 for training a unified recommendation engine machine learning model, in accordance with embodiments of the present disclosure. The workflow 300 may be performed by processing logic executed by a processor of a computing device. The workflow 300 may be implemented, for example, by one or more modules URE Module 140 executing on a processing device 702 of computing device 700 show in FIG. 7. Additionally, FIGS. 2 and 4 describes example operations and/or methods associated with training or applying a trained machine learning mode to input predictions. The operations and/or methods described with reference to FIGS. 2 and 4 may be performed by processing logic that may comprise hardware (e.g., circuitry, dedicated logic, programmable logic, microcode, etc.), software (e.g., instructions run on a processing device to perform hardware simulation), or a combination thereof. These methods and/or operations may be implemented, for example, by one or more URE module 140 executing on a processing device 702 of computing device 700 shown in FIG. 7.

The training dataset 310 can contain hundreds, thousands, tens of thousands, hundreds of thousands or more predictions 333 and associated actions 334. Predictions 333 can be a list of predicted outcomes associated with one or more devices in a system. In embodiments, the predictions 333 can include outputs from a number of individual machine learning models that predict failures associated with devices in a system. The actions 334 can be a list of resolution actions associated with the predicted outcomes. Resolution actions can include a radio reset, a device reboot, and a channel scan, for example. In embodiments, actions 334 can be provided as output from the individual machine learning models that predict the failures associated with the devise in the system. IN embodiments, actions 334 can be provided by a system provider, for example. For example, the provider can provide a list of actions 334 that can be performed on the devices within the system. In embodiments, the training dataset can also include data sources 310A-X, which may include data reported directed from the devices within the system (e.g., devices 135A-X, gateway devices 110A-M of FIG. 1), and/or anonymized device information (e.g., as provided by a system provider). The device information can include, for example, a list of device serial numbers (DSNs) within the system, device model, and/or firmware version installed on the device.

To construct the training dataset 310, the actions 334 are associated with combinations of the predictions 333 received from the subsystems (e.g., the individual machine learning models). In embodiments, each action in actions 334 is associated with a prediction 333 that features of a device will fail and/or that a problem or error will occur. For example, predictions 333 can include, for a particular device, a high probability that a power on reset failure will occur, a high probability that slow browse will occur, and a high probability that Wi-Fi degradation will occur, and a set of actions is associated with this set of predictions. As another example, predictions 333 can include, for a particular device, a low probability that a power on reset failure will occur, a high probability that slow browse will occur, and a medium probability that Wi-Fi degradation will occur, and another set of actions is associated with this set of predictions. In embodiments, a low probability that a failure will occur is a probability between zero and 0.5; a medium probability that a failure will occur is a probability between 0.5 and 0.75 (inclusive); and high probability that a failure will occur is a probability between 0.75 and 1.

The training dataset 310 is provided as input to a multi-class estimator 320. The multi-class estimator 320 is used to generate a trained URE machine learning model 340. The outputs of the URE model 340 include a probability distribution of the actions to take, ranked from highest probability action to lowest probability action. The highest probability action can be the action that the URE machine learning model 340 predicts has the best chance of resolving one or more of the predicted outcomes, while the lowest probability action can be the action that the URE machine learning model 340 predicts has the lowest chance of resolving one or more of the predicted outcomes. The action module 350 receives the probability distribution from the URE model 340 and determines which action(s) to take.

In embodiments, the system of systems (SoS) Y can be defined as $Y=f(Z')$. Y can be encoded as $Y=S_t^d$. Furthermore, in embodiments, $Z=ss_{1,t}^d+ss_{2,t}^d+ss_{3,t}^d=$PoR+SlowBrowse+ WiFi_Performance. Z' can be described as a master system composed of unique feature F', where $F' \subseteq Z'$. For example:

$$ss_{1,t}^d = f_{1,t}^1 + f_{2,t}^1 + f_{3,t}^1 + \text{prob}_t^1$$

$$ss_{2,t}^d = f_{1,t}^2 + f_{2,t}^2 + f_{3,t}^2 + f_{4,t}^2 + f_{5,t}^2 + f_{6,t}^2 + \text{prob}_t^2$$

$$ss_{3,t}^d = f_{1,t}^3 + f_{2,t}^3 + f_{3,t}^3 + f_{4,t}^3 + \text{prob}_t^3$$

The multi-class estimator 320 can use the estimating equation $Y=f(Z')$. That is, $$Y = \alpha_0 + \beta_1 f_{1,t}^1 + \beta_2 f_{2,t}^1 + \beta_3 f_{3,t}^1 + \beta_5 \text{prob}_t^1 + \beta_6 f_{1,t}^2 + \beta_7 f_{2,t}^2 + \beta_8 f_{4,t}^2 + \beta_9 f_{5,t}^2 + \beta_{10} f_{6,t}^2 + \beta_{11} \text{prob}_t^2 + \beta_{12} f_{1,t}^3 + \beta_{13} f_{3,t}^3 + \beta_{14} f_{4,t}^3 + \beta_{15} \text{prob}_t^3 + \varepsilon_t$$

In various embodiments, the dependent variable $S_t^d$ can be classified using several approaches. A first approach can include listing each set of actions for each output combination. For example, $v_{1,t}$ is the output for PoR subsystem ($ss_1$); $v_{2,t}$ is the output for Slow Browse subsystem ($ss_2$); and $v_{3,t}$ is the output for WiFi degradation subsystem ($ss_3$). Furthermore, $0 < v_{i,t}^d \leq 0.5$ can be considered low; $0.5 \leq v_{i,t}^d \leq 0.75$ can be considered medium; and $0.75 \leq v_{i,t}^d \leq 1$ can be considered high. Hence, the various combinations of $v_{1,t}, v_{2,t}, v_{3,t}$ for a device for dependent variable $S_t^d$ can include the following combinations: high-high-high, low-low-low, high-low-medium, medium-medium-medium, low-medium-medium, high-high-low, high-high-medium, low-medium-high, etc. For example, the combination high-high-high means that for device d, the PoR probability is high, the slow browse probability is high, and the Wi-Fi performance degradation is high.

A second approach to classifying the dependent variable $S_t^d$ can include cross-referencing the predicted devices with all the devices in a particular system. The actions can be identified for each device that is cross-referenced. The dependent variable Y can be constructed as a concatenation of actions at a time t. For example, $Y_t = \text{Actions}_t$.

$$Y = \alpha_0 + \beta_1 f_{1,t}^1 + \beta_2 f_{2,t}^1 + \beta_4 f_{3,t}^1 + \beta_5 \text{prob}_t^1 + \beta_6 f_{1,t}^2 + \beta_7 f_{2,t}^2 + \beta_8 f_{4,t}^2 + \beta_9 f_{5,t}^2 + \beta_{10} f_{6,t}^2 + \beta_{11} \text{prob}_t^2 + \beta_{12} f_{1,t}^3 + \beta_{13} f_{3,t}^3 + \beta_{14} f_{4,t}^3 + \beta_{15} \text{prob}_t^3 + \varepsilon_t$$

where:

| Y | $f_{1,t}^1$ | $f_{2,t}^1$ | $f_{3,t}^1$ | $\text{prob}_t^1$ | $f_{1,t}^2$ | $f_{2,t}^2$ | $f_{4,t}^2$ | $f_{5,t}^2$ | $f_{6,t}^2$ | $\text{prob}_t^2$ | $f_{1,t}^3$ | $f_{3,t}^3$ | $f_{4,t}^3$ | $\text{prob}_t^3$ |
|---|---|---|---|---|---|---|---|---|---|---|---|---|---|---|
| Action$_1$ | 23 | 4 | 85 | .24 | 235 | 66 | 46 | −98 | 94 | .87 | 68 | −98 | 89 | .7 |
| Action$_2$ | 56 | −9 | 3 | .32 | 89 | 23 | 10 | −9 | 688 | .12 | 33 | −7 | 78 | .12 |
| Action$_3$ | 10 | 6 | −30 | .56 | 77 | 45 | 79 | −98 | 45 | .67 | 929 | −98 | 45 | .3 |

Using either approach to classify the dependent variable described above, the multi-class estimator 320 can construct the master system from the sub-systems, e.g. as Y=f(Z'). The trained URE model 340 can then estimate Y at a time T. Let Y' be the Y estimate at time T. Then, for every predefined time period (e.g., for every hour), predict Y' which includes recommended actions for every device in the system, ranked by probability.

Once the URE model 340 is trained, the predictions 333 can be provided as input to the URE model 340 (via 380). The URE model 340 can output a set of resolution actions to resolve the predictions. That is, the output of the multi-class model is a probability distribution of the actions to take to resolve the predicted outcomes received from the sub-system machine learning models.

The action module 350 can execute one or more of the output set of resolution actions. That is, at time T, action module 350 can receive Y', i.e., the list of recommended actions for every device in the system, ranked by probability, and execute the recommended action that has the highest probability at time T+1. Based on the result of the execution of the resolution action(s), the action module 350 can update the training dataset 310 (via 382). That is, if the execution of the recommended action with the highest probability at time T+1 resolved the predicted outcome, the actions module 350 can update the training dataset 310 with the executed action and the predicted outcomes it resolved. If the execution of the recommended action with the highest probability at time T+1 did not resolve the predicted outcome, the action module 350 can execute the recommended action with the second highest probability at time T+2. If the execution of the second recommended action resolved the predicted outcome, the action module 350 can update the training dataset 310 with the executed action and the predicted outcomes it resolved. The updated training dataset 310 can be used to retrain the URE model 340, thus leading to improved functioning over time.

Action module 350 can compute SHAP values for each recommended action to determine the features in the master system that are driving the recommended actions. SHAP stands for SHapley Additive exPlanations, and can quantify the contribution of the features that were used by the machine learning model in making its prediction(s). Hence, SHAP values can provide an explanation for why a model predicted certain outcomes. The SHAP values can be used to determine the root cause of the predicted outcomes, as further described with reference to FIGS. 6A, 6B.

In embodiments, the action module 350 can monitor for frequently occurring recommended actions. The action module 350 can keep track of the recommended resolution actions for a specific device. For example, action module 350 can receive multiple sets of resolution actions over a threshold period of time (e.g., over 3 days, or 5 days). Once the device receives the same recommended resolution action repeatedly for a threshold period of time (i.e., the multiple sets of resolution actions include duplicated actions for a particular device), the action module 350 can identify the recommended resolution action as a frequently occurring recommended action. For example, the URE model 340 may recommend the same resolution action for a particular device for a threshold period of time if no other actions have resolved the predicted failures (e.g., the URE model 340 can repeatedly recommend a system reboot for the device if no other actions have resolved a predicted failure). If the action module 350 identifies a frequently occurring recommended action for a particular device for a threshold period of time (e.g., 3 days), the action module 350 can cause the training dataset 310 to be restored to a previous version. For example, the action module 350 can re-seed the training dataset 310 with the initial mapping training dataset used to train the URE model 340. In embodiments, a previous version of the training dataset and/or the initial mapping training dataset can be stored in a data store (not pictured).

Figure 4A:
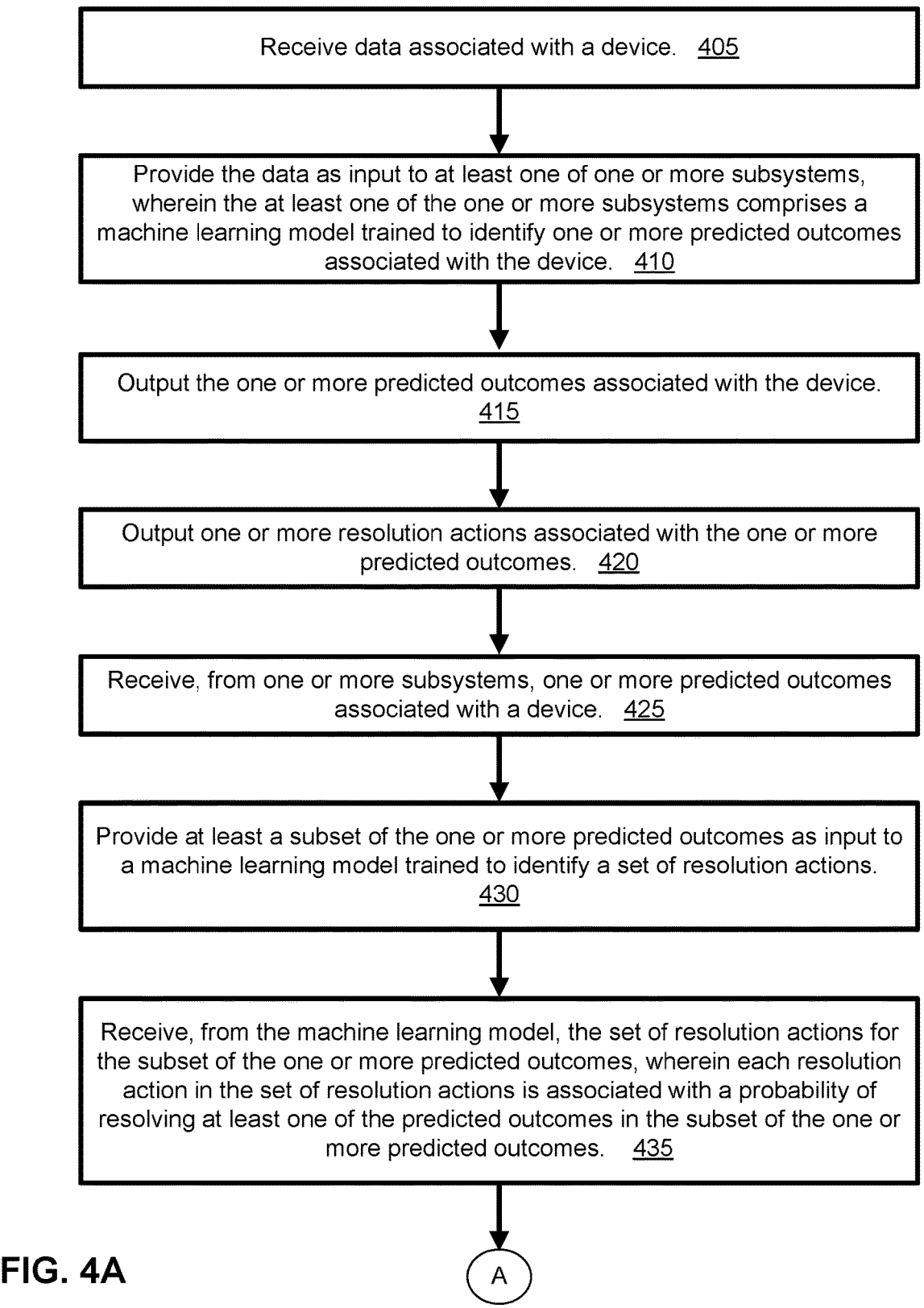
FIGS. 4A-C are a flow charts of an example method for implementing a unified recommendation engine, in accordance with some embodiments of the present disclosure.
Figure 4B:
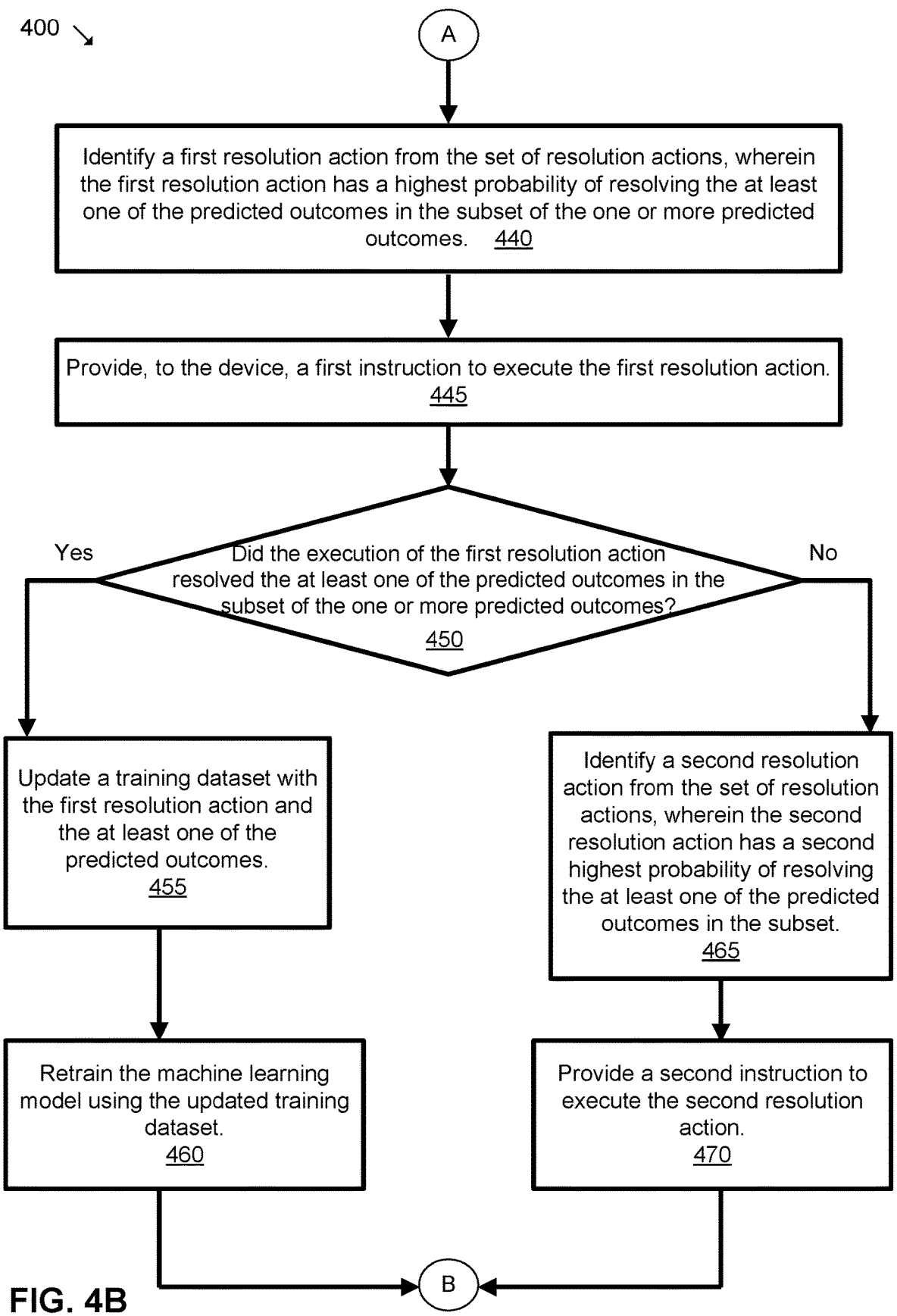
Figure 4C:
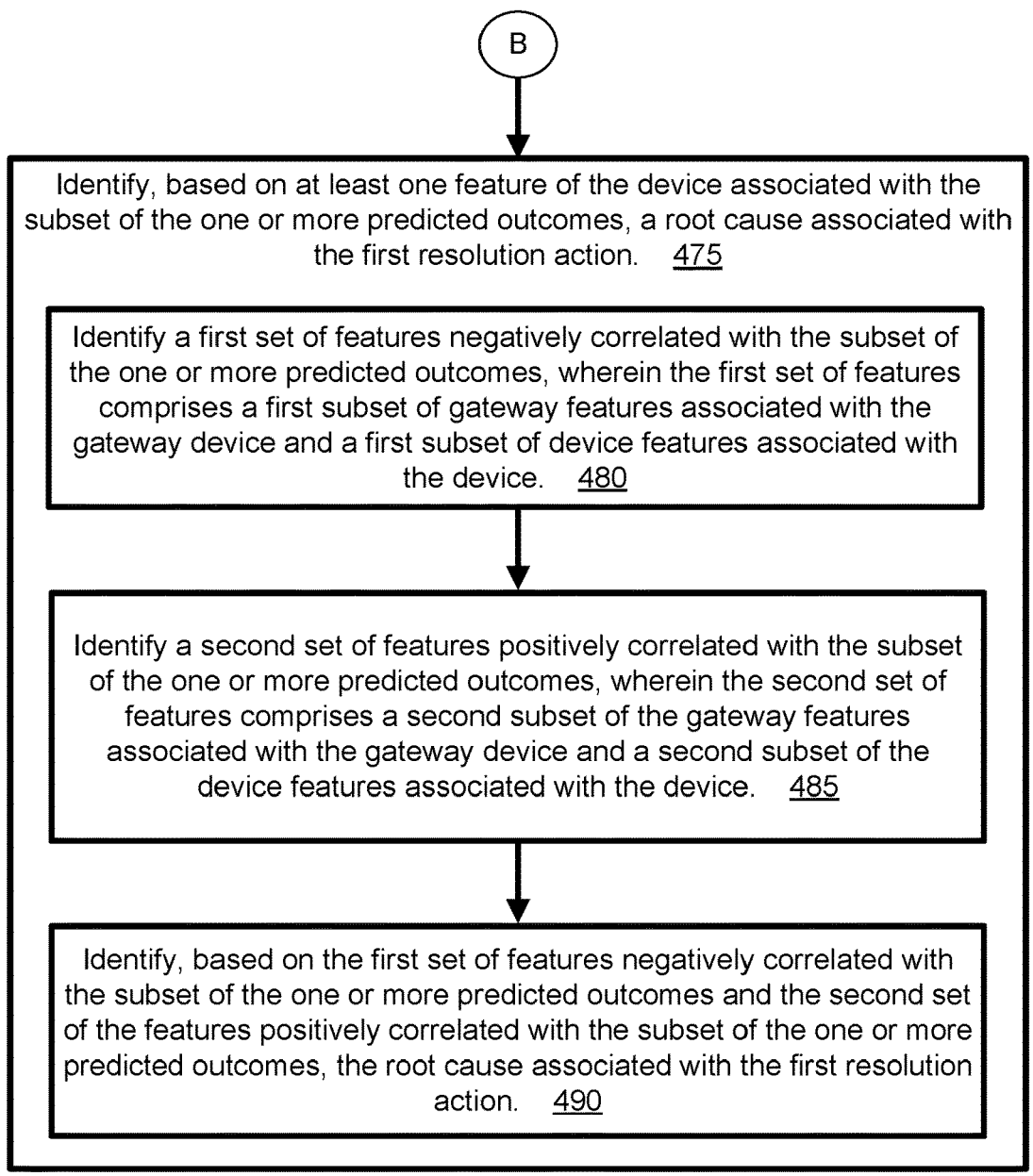

FIGS. 4A-C are flow diagrams of a method 400 for implementing a unified recommendation engine, in accordance with embodiments of the present disclosure. The method 400 may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the method 400 can be performed by URE 140 of FIG. 1. Note that the URE 140 can perform all or parts of method 400 for multiple devices simultaneously.

Referring to FIG. 4A, at block 405 of method 400, processing logic receives data associated with a device. The device can be a client computing device, such as devices 135A-X as described with reference to FIG. 1. In embodiments, the device can be a gateway computing device, such as gateway computing device 110A-M as described with reference to FIG. 1. In some embodiments, the device can be connected to a gateway computing device. The data can be received from the device itself, or from a device managing the device.

At block 410, processing logic provides the data as input to at least one of one or more subsystems. The one or more subsystems can include machine learning models trained to identify one or more predicted outcomes associated with the device.

In embodiments, the one or more subsystems can be distinct machine learning models that each predict an outcome (e.g., a failure) for the device. The distinct machine learning models can each receive data reports generated by the device and/or the gateway device as input, and can output one or more predicted outcomes (or failures) for the device. Each predicted outcome is associated with a probability that the outcome will occur.

At block 415, processing logic can provide as output the one or more predicted outcomes associated with the device. In some embodiments, at block 420, processing logic can provide as output one or more resolution actions associated with the one or more predicted outcomes.

At block 425, processing logic receives, from the one or more subsystems, the one or more predicted outcomes associated with a device.

In embodiments, the predicted outcomes can each be associated with at least one feature of the device and/or one feature of the gateway device. Example gateway and/or device features can include software features and hardware features. Software features can include CPU usage, firmware features (e.g., device behavior changes between releases, changes between connected device releases), kernel features, application features, a connected device count, NAT sessions, etc. Hardware features can include memory (high or low default values), noise floor (high or low beyond valid levels), DSL (high or low beyond valid levels), device age, reboot history, etc. The features can be classified, for example by network (e.g., LAN or Wi-Fi) or Internet (e.g., WAN).

At block 430, processing logic provides at least a subset of the one or more predicted outcomes as input to a unified recommendation engine (URE) machine learning model trained to identify a set of resolution actions. In embodiments, the subset of the one or more predicted outcomes includes the predicted outcomes that have a probability that exceeds a threshold value. For example, if the threshold value is 0.80, the subset of the one or more predicted outcomes includes the predicted outcomes have a probability that exceeds 0.80. In embodiments, the subset can include all of the one or more predicted outcomes associated with a device.

In embodiments, the URE machine learning model is trained using a decision tree, a neural network, a random forest, or another multi-class estimator technique. The processing logic can receive a training dataset that includes a plurality of predicted outcomes and a plurality of associated resolution actions. The training dataset can be provided as input into an untrained machine learning model, and the processing logic can train the untrained machine learning model based on the training dataset to generate the URE machine learning model trained to identify the set of resolution actions for the one or more predicted outcomes.

At block 435, processing logic receives, from the URE machine learning model, the set of resolution actions for the subset of the one or more predicted outcomes. Each resolution action in the set of resolution actions is associated with a probability of resolving at least one of the predicted outcomes in the subset of the one or more predicted outcomes. In embodiments, processing logic can rank the set of resolution actions by the probability of resolving at least one of the predicted outcomes.

Referring to FIG. 4B, at block 440, processing logic identifies a first resolution from the set of resolution actions, wherein the first resolution action has a highest probability of resolving the at least one of the predicted outcomes in the subset of the one or more predicted outcomes.

At block 445, processing logic provides, to the device, a first instruction to execute the first resolution action. In embodiments, providing the first instruction to the device can include executing the first resolution action, or scheduling the first instruction to be executed according to a maintenance window time period. A maintenance window can be a predetermined period of time during which resolution actions may be performed. In embodiments, different resolution actions can have different maintenance windows. For example, the resolution action to reboot the device can be limited to performance between 2 am and 4 am, while a channel rescan resolution action can be performed between 11 pm and 3 am. In embodiments, processing logic can implement a queue manager to schedule the resolution action(s) according to the maintenance window(s).

At block 450, processing logic can determine whether the execution of the first resolution action resolved the at least one of the predicted outcomes in the subset of the one or more predicted outcomes. In embodiments, processing logic can receive the set of resolution actions at time T, and processing logic can determine that the first instruction was executed on the device at a time T+1 (e.g., time T plus one minute, or time T plus one hour). After execution of the first instruction, processing logic can receive, from the one or more subsystems (e.g., the one or more discrete machine learning models), one or more updated predicted outcomes associated with the device. The processing logic can determine whether the one or more updated predicted outcomes include the at least one of the predicted outcomes that the first resolution action intended to resolve. If the updated predicted outcomes include the at least one of the predicted outcomes that the first resolution action intended to resolve, processing logic can determine that the execution of the first resolution action did not resolve the at least one of the predicted outcomes. If the updated predicted outcomes do not include the at least one of the predicted outcomes that the first resolution action intended to resolve, processing logic can determine that the execution of the first resolution action resolved the at least one of the predicted outcomes.

In embodiments, processing logic can determine that execution of the first resolution action resolved the at least one of the predicted outcomes associated with the device by monitoring the set of resolution actions from the URE machine learning model. For example, after time T+1, the URE outputs an updated set of resolution actions. If the updated set of resolution actions includes a resolution action for the device, and the resolution action for the device is not "do nothing," processing logic can determine that execution of the first resolution action did not resolve the at least one of the predicted outcomes associated with the device. If the resolution action for the device in the updated set of resolution actions is "do nothing," or if the updated set of resolution actions does not include a resolution action for the device, processing logic can determine that execution of the first resolution action did resolve the at least one of the predicted outcomes associated with the device.

At block 455, in response to determining that the execution of the first resolution action resolved the at least one of the predicted outcomes, processing logic can update the training dataset used to train the URE machine learning model with the first resolution action and the at least one of the predicted outcomes. At block 460, processing logic can retrain the URE machine learning model using the updated training dataset.

At block 465, in response to determining that the execution of the first resolution action did not resolve the at least one of the predicted outcomes, processing logic can identify a second resolution action from the set of resolution actions. The second resolution action can be the resolution action that has the second highest probability of resolving the at least one of the predicted outcomes in the subset of the one or more predicted outcomes. At block 470, processing logic can provide, to the device, a second instruction to execute the second resolution action. In embodiments, providing the second instruction can include scheduling the second instruction to be executed according to a maintenance window associated with the device.

For example, processing logic can determine that the execution of the first resolution action at time T+1 did not resolve the at least one of the predicted outcomes by comparing the updated predicted outcomes received from the subsystems to the at least one of the predicted outcomes that the first resolution action intended to resolve. In embodiments, processing logic can determine that the execution of the first resolution action at time T+1 did not resolve the at least one of the predicted outcomes associated with the device by monitoring the set of resolution actions. If the set of resolution actions includes an action for the device, and the resolution action for the device is not "do nothing," then processing logic can determine that execution of the first resolution action did not resolve the at least one of the predicted outcomes associated with the device.

At time T+2 (e.g., time T plus two minutes, or time T plus two hours), processing logic can determine that the second instruction was executed on the device. After execution of the second instruction, processing logic can determine whether the execution of the second instruction resolved the at least one of the predicted outcomes that the second resolution action intended to resolve. In embodiments, processing logic can receive, from the one or more subsystems (e.g., the one or more discrete machine learning models), a second set of updated predicted outcomes and/or a second set of updated resolution actions associated with the device. If the second set of updated predicted outcomes includes the at least one of the predicted outcomes that the second resolution action intended to resolve (i.e., if, at time T+2 the discrete machine learning models are predicting the same outcomes as previously predicted at time T), or if the second set of updated resolution actions includes the device and the resolution action in the second set is not "do nothing," then processing logic can determine that the execution of the second resolution action did not resolve the at least one of the predicted outcomes that the second resolution action intended to resolve. In such a case, processing logic can identify a third resolution action that has the third highest probability of resolving the at least one of the predicted outcomes in the subset of the one or more predicted outcomes. Processing logic can then provide, to the device, a third instruction to execute the third resolution action.

If, however, the second set of updated predicted outcomes does not include the at least one of the predicted outcomes that the second resolution action intended to resolve (or the device is not included in the second set of updated resolution actions, or if it is included the resolution action for the device is "do nothing"), then processing logic can determine that the execution of the second resolution action resolved the at least one of the predicted outcomes. Processing logic can update the training dataset used to train the URE machine learning model with second resolution action and the at least one of the predicted outcomes. Processing logic can then retrain the URE machine learning model using the updated training dataset.

In embodiments, processing logic can determine that none of the resolution actions in the set of resolution actions resolved the one or more predicted outcomes associated with the device. In such instances, processing logic can update an exceptions data structure (e.g., a list, a table, or some other appropriate data structure) with the device. For example, processing logic can add a device identifier (e.g., the device serial number) to an exceptions table. In embodiments, processing logic can also update the exceptions data structure with the one or more predicted outcomes associated with the device, a timestamp associated with one or more of the predicted outcomes, the resolution actions that executed (and timestamps associated with the execution of the resolution actions), and/or the outcomes associated with the executed resolution actions. In some embodiments, processing logic can determine to add the device to the exceptions data structure if resolution actions do not resolve predicted outcomes associated with the device after a certain time period (e.g., if the output from the URE includes the device in the list of devices for which a predicted outcome is above a certain percentage for 5 hours, or for 5 days, processing logic can add the device to the exceptions data structure).

In embodiments, processing logic can determine not to analyze devices in the exceptions data structure. In embodiments, processing logic can compare the device identifier (e.g., device serial number) to the exceptions data structure to determine whether an exception has been flagged for the device, and if so, processing logic can determine not to output the one or more resolution actions for the device. That is, devices that are included in, and/or flagged, in the exceptions data structure can be taken out of circulation and not analyzed by the URE. In embodiments, processing logic can automatically update the exceptions data structure after a predetermined time period (e.g., after 3 days) if a device has been included in, or flagged in the exceptions data structure continuously. That is, processing logic can determine that a device has been out of circulation and not analyzed by the URE for a predetermined time period (e.g., 3 days) by monitoring the exceptions data structure, and processing can automatically update the exceptions data structure to resubmit the device to URE analysis after the predetermined time period. In some embodiments, the device can be resubmitted to URE analysis by a user.

Referring to FIG. 4C, in some embodiments, at block 475, processing logic can identify, based on at least one feature of the device associated with the subset of the one or more predicted outcomes, a root cause associated with the first resolution action. In order to identify the root cause associated with the first resolution action, processing logic can at block 480, identify, using a correlation matrix, a first set of features negatively correlated with the subset of the one or more predicted outcomes. The first set of features can include a first subset of gateway features associated with the gateway device connected to the device, and a first subset of device features associated with the device. At block 485, processing logic can identify, using the correlation matrix, a second set of features positively correlated with the subset of the one or more predicted outcomes. The second set of features can include a second subset of gateway features associated with the gateway device and a second subset of the device features associated with the device.

In embodiments, the first set of features negatively correlated with the subset of the one or more predicted outcomes comprises features that have a first correlation value that satisfies a first threshold (e.g., the absolute value of the first correlation value is greater than 0.5). Similarly, the second set of features positively correlated with the subset of the one or more predicted outcomes comprises features that have a second correlation value that satisfies a second threshold (e.g., the absolute value of the second correlation value is greater than 0.5). The first threshold and the second threshold can represent different values.

Processing logic can identify, based on the first set of features negatively correlated with the subset of the one or more predicted outcomes and the second set of the features positively correlated with the subset of the one or more predicted outcomes, the root cause associated with the first resolution action.

In embodiments, processing logic can identify, using the correlation matrix, the first set of features negatively correlated with the subset of the one or more predicted outcomes for a predetermined period of time preceding a time at which the first resolution action from the set of resolution actions is identified. Processing logic can identify, using the correlation matrix, the second set of features positively correlated with the subset of the one or more predicted outcomes for the predetermined period of time preceding the time at which the first resolution action from the set of resolution actions is identified.

In some embodiments, processing logic can identify the root cause associated with the first resolution action using a multiple linear regression algorithm. That is, processing logic can identify, using a multiple linear regression algorithm, a first set of features negatively correlated with the subset of the one or more predicted outcomes. The first set of features can include a first subset of gateway features associated with the gateway device and a first subset of device features associated with the device. The first set of features negatively correlated with the subset of the one or more predicted outcomes can include features that have a first test value (or t-statistic) associated with the multiple linear regression algorithm that satisfies a first threshold (e.g., an absolute value of the t-statistic on the estimated parameter of the feature greater than 2).

Processing logic can also identify, using a multiple linear regression algorithm, a second set of features positively correlated with the subset of the one or more predicted outcomes. The second set of features can include a second subset of the gateway features associated with the gateway device and a second subset of the device features associated with the device. The second set of features positively correlated with the subset of the one or more predicted outcomes can include features that have a second test value (or t-statistic) associated with the multiple linear regression algorithm that satisfies a second threshold (e.g., an absolute value of the t-statistic on the estimated parameter of the feature greater than 2). The first threshold and the second threshold can represent different values.

At block 490, processing logic can then identify, based on the first set of features negatively correlated with the subset of the one or more predicted outcomes and the second set of the features positively correlated with the subset of the one or more predicted outcomes, the root cause associated with the first resolution action.

In some embodiments, processing logic can provide an indication of the root cause associated with the first resolution action. In some embodiments, the processing logic can display the root cause in a graphical user interface, for example GUI 500 described with reference to FIG. 5.

Figure 5:
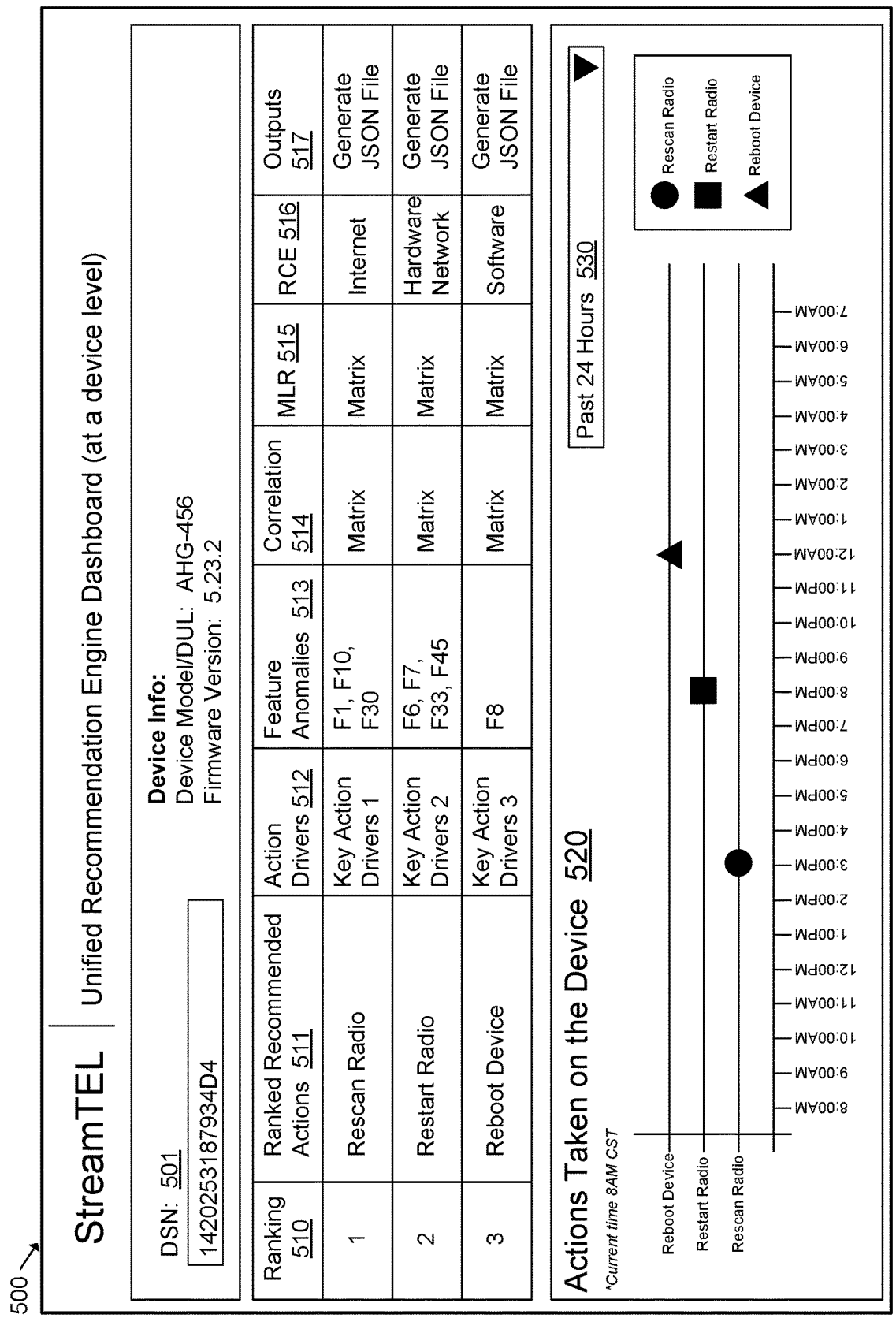
FIG. 5 illustrates an example graphical user interface for a unified recommendation engine dashboard, in accordance with some embodiments of the present disclosure.

FIG. 5 illustrates an example graphical user interface (GUI) 500 of a URE dashboard for a particular device, according to embodiments of the present disclosure. As illustrated in FIG. 5, the URE dashboard 500 can provide information for a particular device, identified by device serial number (DSN) 501. The URE dashboard 500 can include a list of recommended actions 511, listed according to their probability rankings 510. The list of recommended actions 511 can be ranked according to their predicted probabilities. In embodiments, the list of recommended actions 511 can include only actions for which the associated predicted outcome is above 80%, for example.

The recommended actions can be associated with action drivers 512, feature anomalies 513, correction 514, a multiple linear regression (MLR) 515, a root cause explanation 516, and/or an output 517. In embodiments, the URE dashboard 500 can provide fewer or additional columns associated with each recommended action. Additionally, the URE dashboard 500 can include more or fewer than three ranked recommended actions 511.

The URE dashboard 500 can also include a list of the actions taken on the device 520, charted by time, for example. A user can select a time frame from a dropdown menu 530. The timeframe illustrated in FIG. 5 is the past 24 hours. As illustrated in the chart 520, the device 501 underwent a radio rescan action at 3 pm, a radio restart action at 8 pm, and a device reboot at 12 am.

Figure 6A:
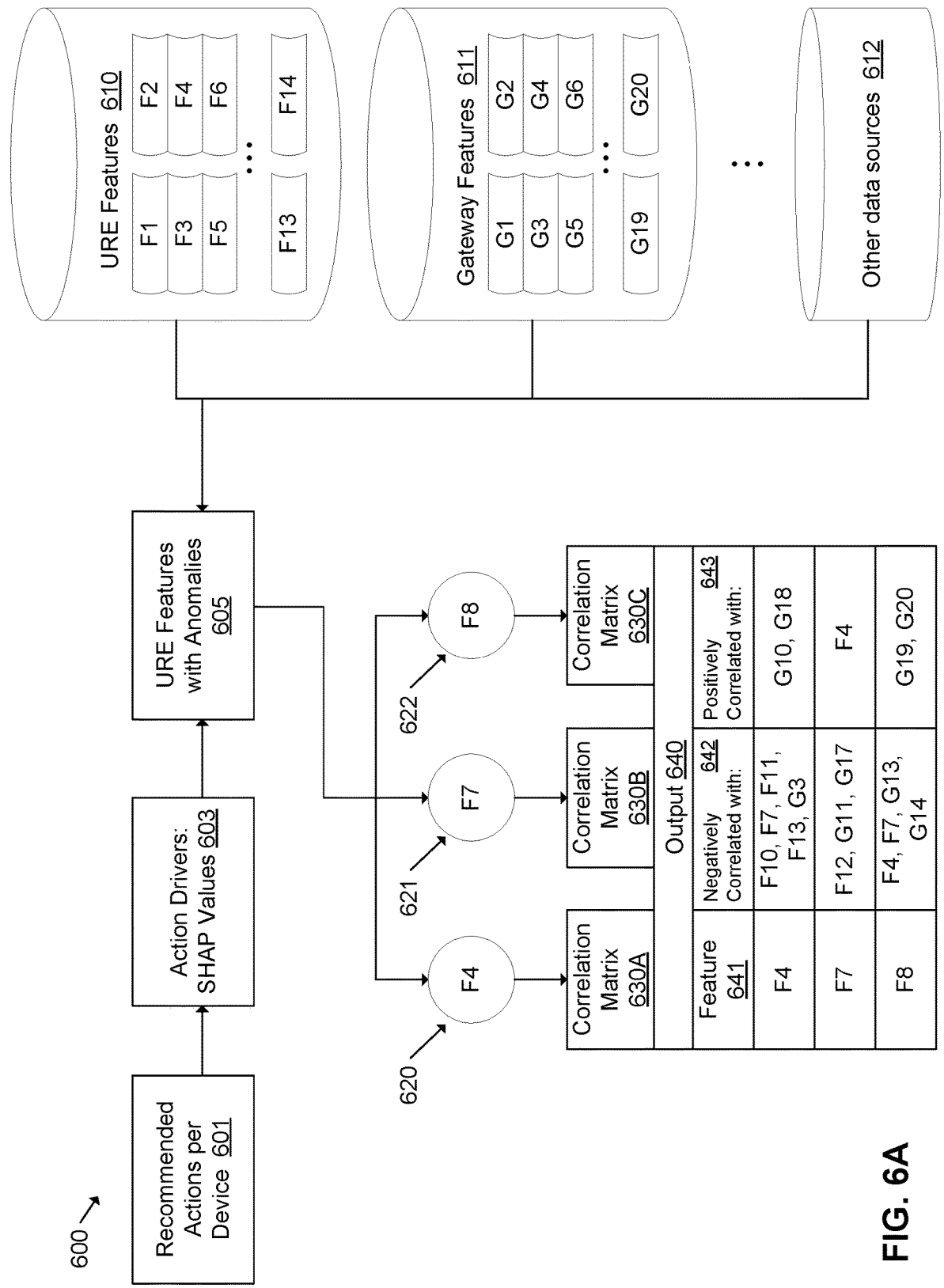
FIGS. 6A and 6B depict two workflows for determining the root causes associated with the resolution actions recommended for a particular device, in accordance with some embodiments of the present disclosure.
Figure 6B:
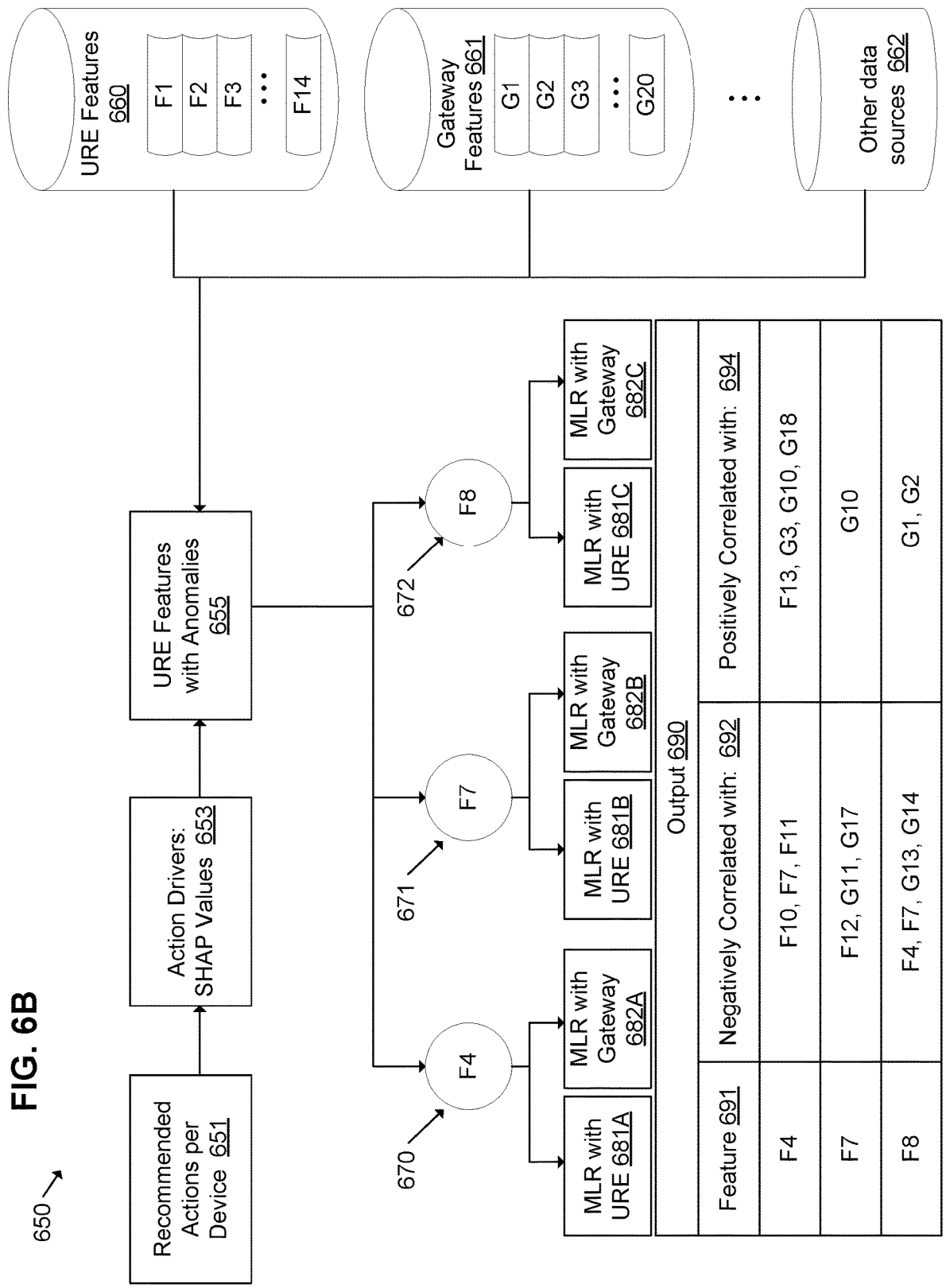

FIGS. 6A and 6B depict two workflows for determining the root causes associated with the resolution actions recommended for a particular device, in accordance with embodiments of the present disclosure. The first workflow 600 depicted in FIG. 6A determines the root cause using a correlation matrix. The second workflow 650 depicted in FIG. 6B determines the root cause using multiple linear regression (MLR). The workflows 600, 650 can be performed by processing logic executed by a processor of a computing device. The workflow 300 may be implemented, for example, by one or more modules URE Module 140 executing on a processing device 702 of computing device 700 show in FIG. 7.

Referring to FIG. 6A, the workflow 600 can begin at block 601 with receiving recommended actions for a device. The recommended actions can be the output of a trained URE machine learning model. At block 603, the workflow can use action drivers to determine SHAP values. At block 605, the workflow identifies URE features that have anomalies; i.e., the features of the device that contributed to the predicted outcome(s) associated with the recommended actions. A list of the URE features can be stored in URE features 610 data store, and a list of gateway features can be stored in gateway features 611 data store. In some embodiments, the anomalies can include additional data (stored in other data sources 612 data store).

As illustrated in the example workflow 600, the detected URE features with anomalies include features F4 (620), F7 (621), and F8 (622). A correlation matrix 630A-C can be applied to each feature 641 to determine the features (both gateway and URE features) that are negatively correlated with each feature (642), and that are positively correlated with each feature (643). The correlation matrix can be a matrix that shows correlation coefficients between the variables. In this example, the variables can be the features, and the correlation matrix 630 can include correlation coefficients between the URE features 610 and the gateway features 611. The correlation coefficients can be used to determine a positive correlation between the features or a negative correlation between the features. In embodiments, the features determined to be correlated with the URE features with anomalies 620, 621, 622 can have a correlation that exceeds a predetermined threshold (e.g., 0.5).

In embodiments, workflow 600 can be used to determine why the identified URE features with anomalies (i.e., F4 620, F7 621, and F8 622) became anomalies. In order to make this determination, the workflow 600 can apply correlation matrix 630A-C, using data for a predetermined amount of time preceding the occurrence of the anomaly (e.g., for x number of hours before the outcomes were predicted; to continue the example above, for x number of hours before time T). For example, if x=6 hours and the time of the anomaly is t, the workflow 650 can apply the correlation matrix 630 using data at F4(t−1), F4(t−2), . . . , F4(t−6) with URE features 610 at time t−1, t−2, . . . , t−6 and Gateway features 611 at time t−1, t−2, . . . , t−6; F7(t−1), F7(t−2), . . . , F7(t−6) with URE features 610 at time t−1, t−2, . . . , t−6 and Gateway features 611 at time t−1, t−2, . . . , t−6; and F8(t−1), F8(t−2), . . . , F8(t−6) with URE features 610 at time t−1, t−2, . . . , t−6 and Gateway features 611 at time t−1, t−2, . . . , t−6.

By identifying the features that are negatively and positively correlated with the URE features with anomalies 620, 621, 622, the workflow can determine the root-cause of the predicted outcome(s) associated with the recommended actions for the device 601.

Referring to FIG. 6A, the workflow 650 can begin at block 651 with receiving recommended actions for a device. The recommended actions can be the output of a trained URE machine learning model. At block 653, the workflow can use action drivers to determine SHAP values. At block 605, the workflow identifies URE features that have anomalies; i.e., the features of the device that contributed to the predicted outcome(s) associated with the recommended actions. A list of the URE features can be stored in URE features 660 data store, and a list of gateway features can be stored in gateway features 661 data store. In some embodiments, the anomalies can include additional data (stored in other data sources 662 data store).

As illustrated in the example workflow 650, the detected URE features with anomalies include features F4 (670), F7 (671), and F8 (672). A multiple linear regression (MLR) function can be applied to each feature 670, 671, 672 to identify the features negatively correlated with the features 692, and the features positively correlated with the features 694. An MLR functions 681A-C, 682A-C can be performed using the features 691 as the dependent variables, and the URE and gateway features as independent variables. The features identified as negatively correlated 692 and/or positively correlated 694 can have an absolute test value that exceeds a predefined threshold (e.g., greater than 2).

In embodiments, workflow 650 can be used to determine why the identified URE features with anomalies (i.e., F4 670, F7 671, and F8 672) became anomalies. In order to make this determination, the workflow 650 can run the MLR correlation algorithms 681A-C, 682A-C using data for a predetermined amount of time preceding the occurrence of the anomaly (e.g., for x number of hours before the outcomes were predicted; to continue the example above, for x number of hours before time T). For example, if x=6 hours and the time of the anomaly is t, the workflow 650 can run the MLR correlations 681A-C, 682A-C using data at F4(t−1), F4(t−2), . . . , F4(t−6) with URE features 660 at time t−1, t−2, . . . , t−6 and Gateway features 661 at time t−1, t−2, . . . , t−6; F7(t−1), F7(t−2), . . . , F7(t−6) with URE features 660 at time t−1, t−2, . . . , t−6 and Gateway features 661 at time t−1, t−2, . . . , t−6; and F8(t−1), F8(t−2), . . . , F8(t−6) with URE features 660 at time t−1, t−2, . . . , t−6 and Gateway features 661 at time t−1, t−2, . . . , t−6.

Figure 7:
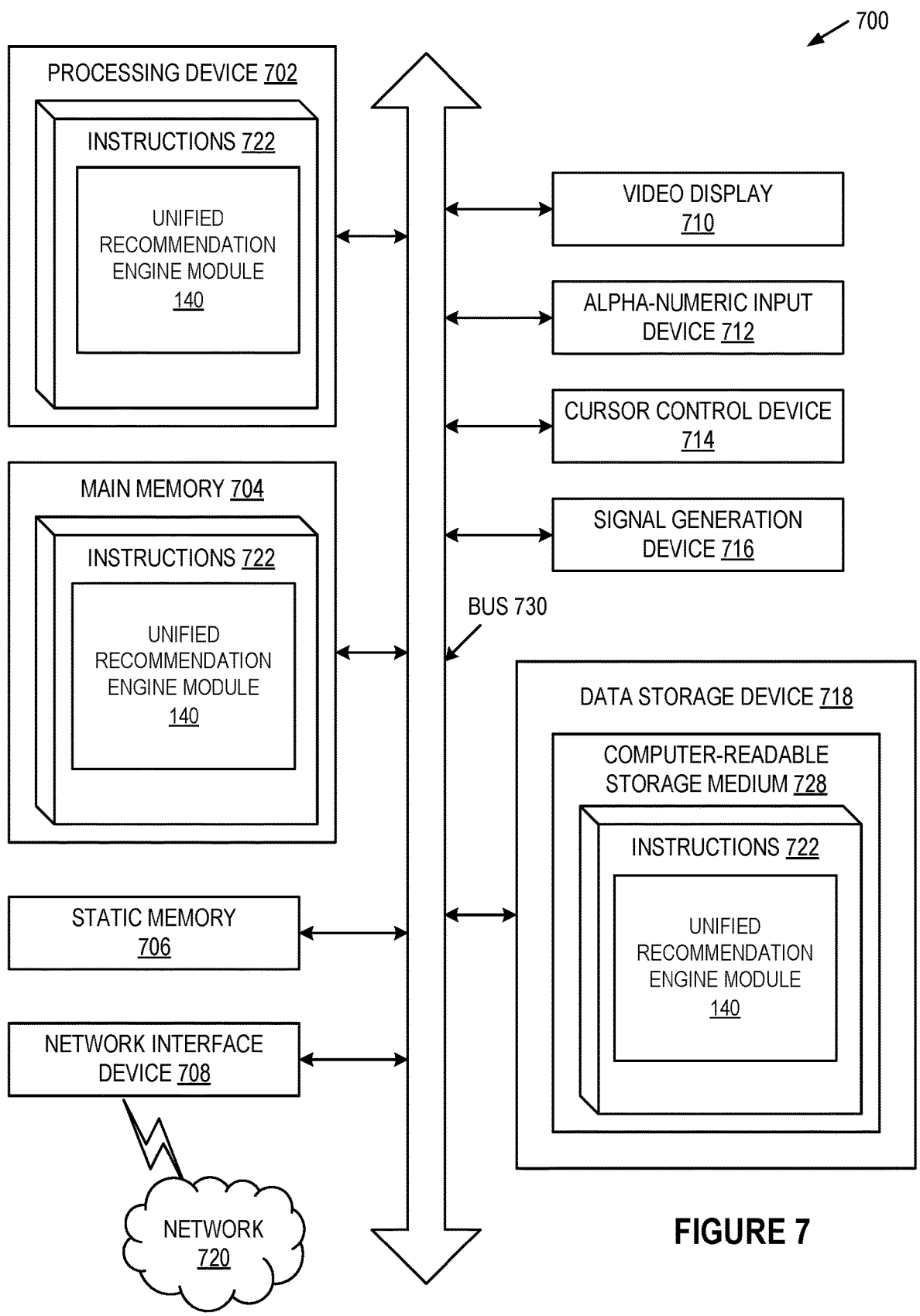
FIG. 7 illustrates a block diagram of an example computing device in which embodiments of the present disclosure may operate.

FIG. 7 illustrates a diagrammatic representation of a machine in the example form of a computing device 700 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory (e.g., a data storage device 718), which communicate with each other via a bus 730.

Processing device 702 represents one or more general-purpose processors such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute the processing logic (instructions 722) for performing the operations and steps discussed herein.

The computing device 700 may further include a network interface device 808. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-readable storage medium (or more specifically a computer-readable storage medium) 728 on which is stored one or more sets of instructions 722 embodying any one or more of the methodologies or functions described herein. The instructions 722 may also reside, completely or at least partially, within the main memory 704 and/or within the processing device 702 during execution thereof by the computer system 700, the main memory 704 and the processing device 702 also constituting computer-readable storage media.

The computer-readable storage medium 728 may also be used to store a unified recommendation engine module 140 (as described with reference to FIG. 1), and/or a software library containing methods that call a unified recommendation engine module 140. While the computer-readable storage medium 728 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

The modules, components and other features described herein (for example in relation to FIGS. 1-3, 6A-6B) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "identifying", "determining", "selecting", "analyzing", "generating", "performing", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
receiving, from one or more subsystems, one or more predicted outcomes associated with a device connected to a gateway device, wherein each of the one or more predicted outcomes is associated with at least one feature of the device;
providing a subset of the one or more predicted outcomes as input to a machine learning model trained to identify a set of resolution actions for the subset of the one or more predicted outcomes;
receiving, from the machine learning model, the set of resolution actions for the subset of the one or more predicted outcomes, wherein each resolution action in the set of resolution actions is associated with a probability of resolving at least one of the predicted outcomes in the subset of the one or more predicted outcomes;
identifying a first resolution action from the set of resolution actions, wherein the first resolution action has a highest probability of resolving the at least one of the predicted outcomes in the subset of the one or more predicted outcomes;
identifying using a multiple linear regression algorithm, a first set of features negatively correlated with the subset of the one or more predicted outcomes, wherein the first set of features comprises a first subset of gateway features associated with the gateway device and a first subset of device features associated with the device, and wherein the first set of features comprises features that have a first test value associated with the multiple linear regression algorithm that satisfies a first threshold;
identifying, using the multiple linear regression algorithm, a second set of features positively correlated with the subset of the one or more predicted outcomes, wherein the second set of features comprises a second subset of the gateway features associated with the gateway device and a second subset of the device features associated with the device, and wherein the second set of features comprises features that have a second test value associated with the multiple linear regression algorithm that satisfies a second threshold;
identifying, based on the first set of features negatively correlated with the subset of the one or more predicted outcomes and the second set of features positively correlated with the subset of the one or more predicted outcomes, a root cause associated with the first resolution action; and
providing, to the device, a first instruction to execute the first resolution action.

2. The method of claim 1, wherein the first set of features and the second set of features are identified using a correlation matrix.

3. The method of claim 2, wherein the first set of features negatively correlated with the subset of the one or more predicted outcomes comprises features that have a first correlation value that satisfies a first correlation threshold, and wherein the second set of features positively correlated with the subset of the one or more predicted outcomes comprises features that have a second correlation value that satisfies a second correlation threshold.

4. The method of claim 2, further comprising:
identifying, using the correlation matrix, the first set of features negatively correlated with the subset of the one or more predicted outcomes for a predetermined period of time preceding a time at which the first resolution action from the set of resolution actions is identified; and
identifying, using the correlation matrix, the second set of features positively correlated with the subset of the one or more predicted outcomes for the predetermined period of time preceding the time at which the first resolution action from the set of resolution actions is identified.

5. The method of claim 1, further comprising:
receiving a training dataset comprising a plurality of predicted outcomes and a plurality of resolution actions;
providing the training dataset as input into an untrained machine learning model; and
training the untrained machine learning model based on the training dataset to generate the machine learning model trained to identify the set of resolution actions.

6. The method of claim 1, further comprising:
providing, to the device, at least one of the first resolution action, the at least one of the predicted outcomes, or an indication of the root cause associated with the first resolution action.

7. A system comprising:
a memory; and
a processing device operatively coupled to the memory, the processing device to:
receive, from one or more subsystems, one or more predicted outcomes associated with a device connected to a gateway device, wherein each of the one or more predicted outcomes is associated with at least one feature of the device;
provide a subset of the one or more predicted outcomes as input to a machine learning model trained to identify a set of resolution actions for the subset of the one or more predicted outcomes;
receive, from the machine learning model, the set of resolution actions for the subset of the one or more predicted outcomes, wherein each resolution action in the set of resolution actions is associated with a probability of resolving at least one of the predicted outcomes in the subset of the one or more predicted outcomes;
identify a first resolution action from the set of resolution actions, wherein the first resolution action has a highest probability of resolving the at least one of the predicted outcomes in the subset of the one or more predicted outcomes;
identify using a multiple linear regression algorithm, a first set of features negatively correlated with the subset of the one or more predicted outcomes, wherein the first set of features comprises a first subset of gateway features associated with the gateway device and a first subset of device features associated with the device, and wherein the first set of features comprises features that have a first test value associated with the multiple linear regression algorithm that satisfies a first threshold;
identify, using the multiple linear regression algorithm, a second set of features positively correlated with the subset of the one or more predicted outcomes, wherein the second set of features comprises a second subset of the gateway features associated with the gateway device and a second subset of the device features associated with the device, and wherein the second set of features comprises features that have a second test value associated with the multiple linear regression algorithm that satisfies a second threshold;
identify, based on the first set of features negatively correlated with the subset of the one or more predicted outcomes ad the second set of features positively correlated with the subset of the one or more predicted outcomes, a root cause associated with the first resolution action; and
provide, to the device, a first instruction to execute the first resolution action.

8. The system of claim 7, wherein the first set of features and the second set of features are identified using a correlation matrix.

9. The system of claim 8, wherein the first set of features negatively correlated with the subset of the one or more predicted outcomes comprises features that have a first correlation value that satisfies a first correlation threshold, and wherein the second set of features positively correlated with the subset of the one or more predicted outcomes comprises features that have a second correlation value that satisfies a second correlation threshold.

10. The system of claim 8, wherein the processing device is to:
identify, using the correlation matrix, the first set of features negatively correlated with the subset of the one or more predicted outcomes for a predetermined period of time preceding a time at which the first resolution action from the set of resolution actions is identified; and
identify, using the correlation matrix, the second set of features positively correlated with the subset of the one or more predicted outcomes for the predetermined period of time preceding the time at which the First resolution action from the set of resolution actions is identified.

11. The system of claim 7, wherein the processing device is to:
provide, to the device, at least one of the first resolution action, the at least one of the predicted outcomes, or an indication of the root cause associated with the first resolution action.

12. A non-transitory computer readable storage medium comprising instructions that, when executed by a processing device, cause the processing device to perform operations comprising:
receiving, from one or more subsystems, one or more predicted outcomes associated with a device connected to a gateway device, wherein each of the one or more predicted outcomes is associated with at least one feature of the device;
providing a subset of the one or more predicted outcomes as input to a machine learning model trained to identify a set of resolution actions for the subset of the one or more predicted outcomes;

receiving, from the machine learning model, the set of resolution actions for the subset of the one or more predicted outcomes, wherein each resolution action in the set of resolution actions is associated with a probability of resolving at least one of the predicted outcomes in the subset of the one or more predicted outcomes;

identifying a first resolution action from the set of resolution actions, wherein the first resolution action has a highest probability of resolving the at least one of the predicted outcomes in the subset of the one or more predicted outcomes;

identifying, using a multiple linear regression algorithm, a first set of features negatively correlated with the subset of the one or more predicted outcomes, wherein the first set of features comprises a first subset of gateway features associated with the gateway device and a first subset of device features associated with the device and wherein the first set of features comprises features that have a first test value associated with the multiple linear regression algorithm that satisfies a first threshold;

identifying, using the multiple linear regression algorithm, a second set of features positively correlated with the subset of the one or more predicted outcomes, wherein the second set of features comprise a second subset of the gateway features associated with the gateway device and a second subset of the device features associated with the device, and wherein the second set of features comprises features that have a second test value associated with the multiple linear regression algorithm that satisfies a second threshold;

identifying, based on the first set of features negatively correlated with the subset of the one or more predicted outcomes and the second set of features positively correlated with the subset of the one or more predicted outcomes, a root cause associated with the first resolution action; and providing, to the device, a first instruction to execute the first resolution action.

13. The non-transitory computer readable storage medium of claim 12, wherein the first set of features and the second set of features are identified using a correlation matrix.

14. The non-transitory computer readable storage medium of claim 13, wherein the first set of features negatively correlated with the subset of the one or more predicted outcomes comprises features that have a first correlation value that satisfies a first correlation threshold, and wherein the second set of features positively correlated with the subset of the one or more predicted outcomes comprises features that have a second correlation value that satisfies a second correlation threshold.

15. The non-transitory computer readable storage medium of claim 13, the operations further comprising:

identifying, using the correlation matrix, the first set of features negatively correlated with the subset of the one or more predicted outcomes for a predetermined period of time preceding a time at which the first resolution action from the set of resolution actions is identified; and identifying, using the correlation matrix, the second set of features positively correlated with the subset of the one or more predicted outcomes for the predetermined period of time preceding the time at which the first resolution action from the set of resolution actions is identified.

16. The non-transitory computer readable storage medium of claim 13, the operations further comprising:

receiving a training dataset comprising a plurality of predicted outcomes and a plurality of resolution actions;

providing the training dataset as input into an untrained machine learning model; and training the untrained machine learning model based on the training dataset to generate the machine learning model trained to identify the set of resolution actions.

17. The non-transitory computer readable storage medium of claim 13, the operations further comprising:

providing, to the device, at least one of the first resolution action, the at least one of the predicted outcomes, or an indication of the root cause associated with the first resolution action.

* * * * *